D. A. FLAVELL.
WEIGHING AND FILLING MACHINE.
APPLICATION FILED FEB. 21, 1911.

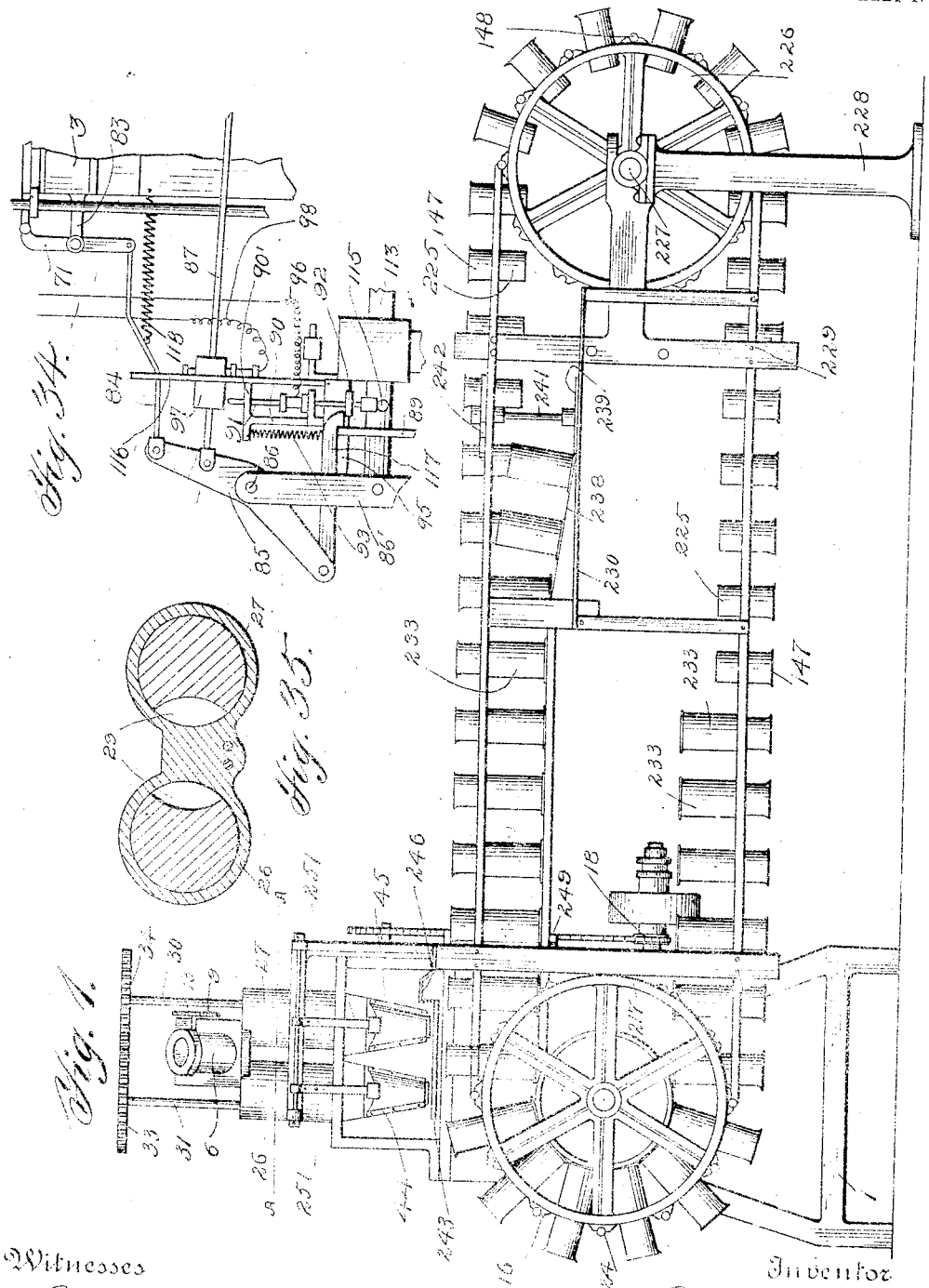

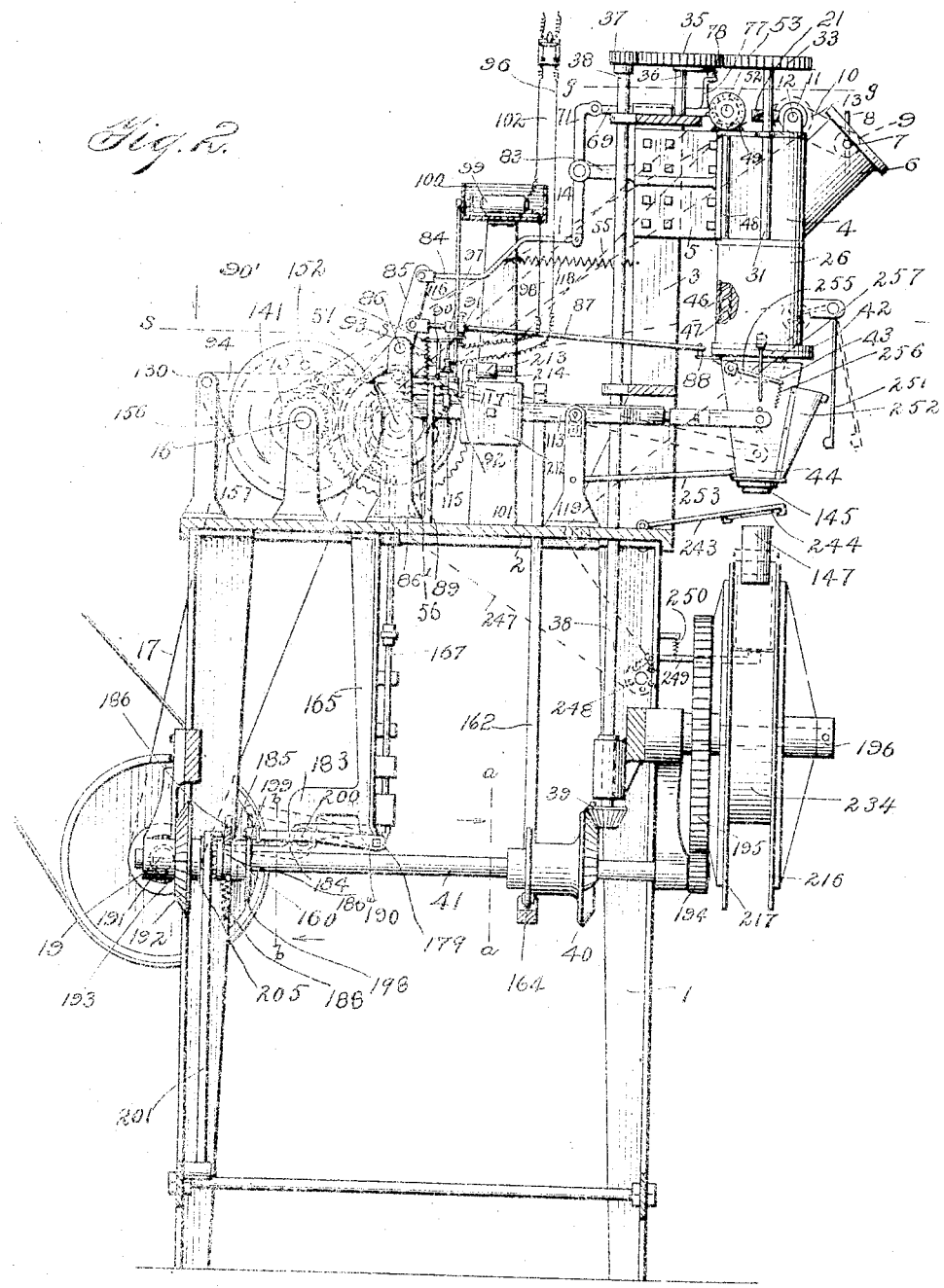

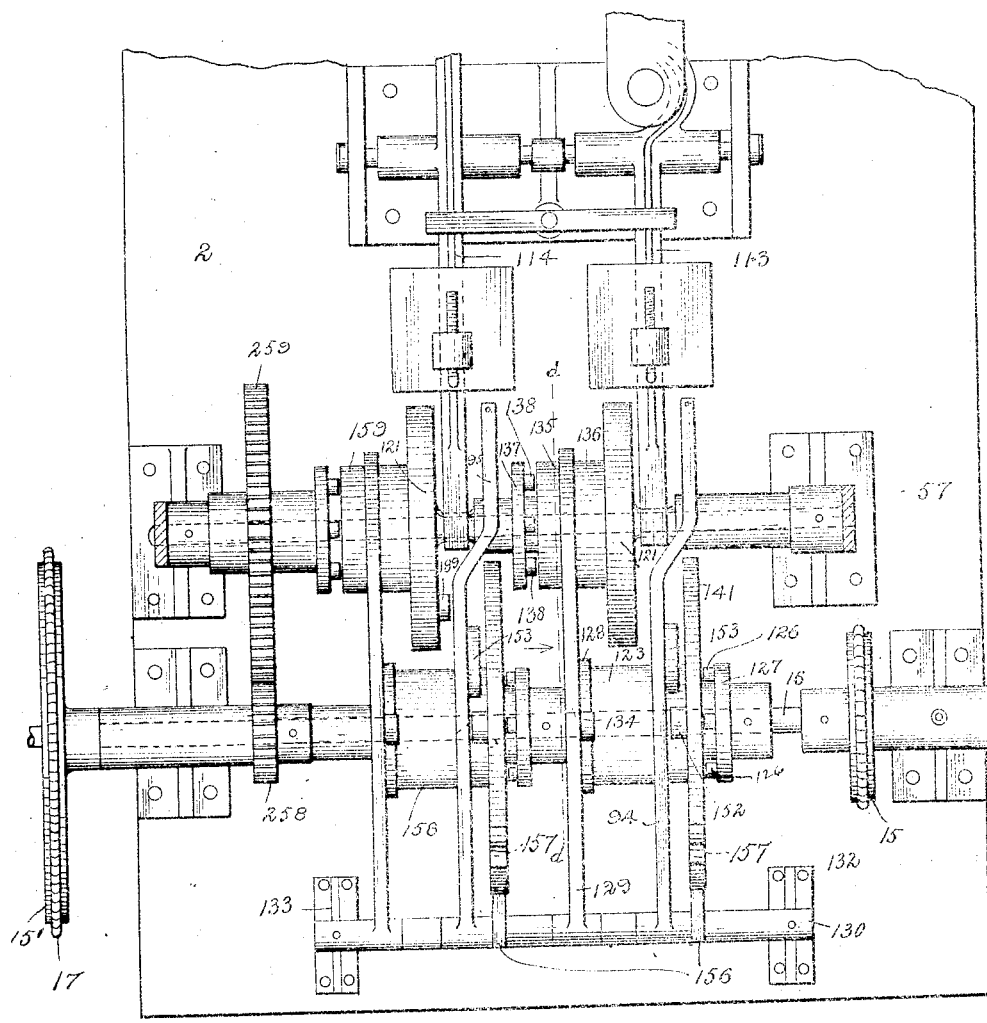

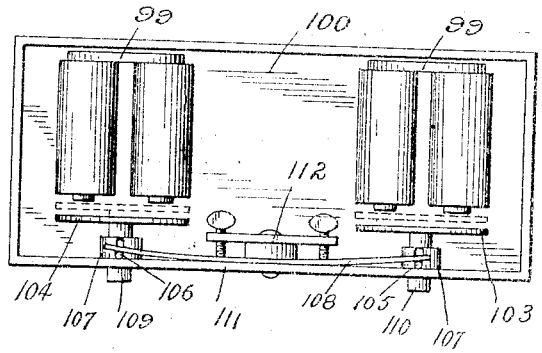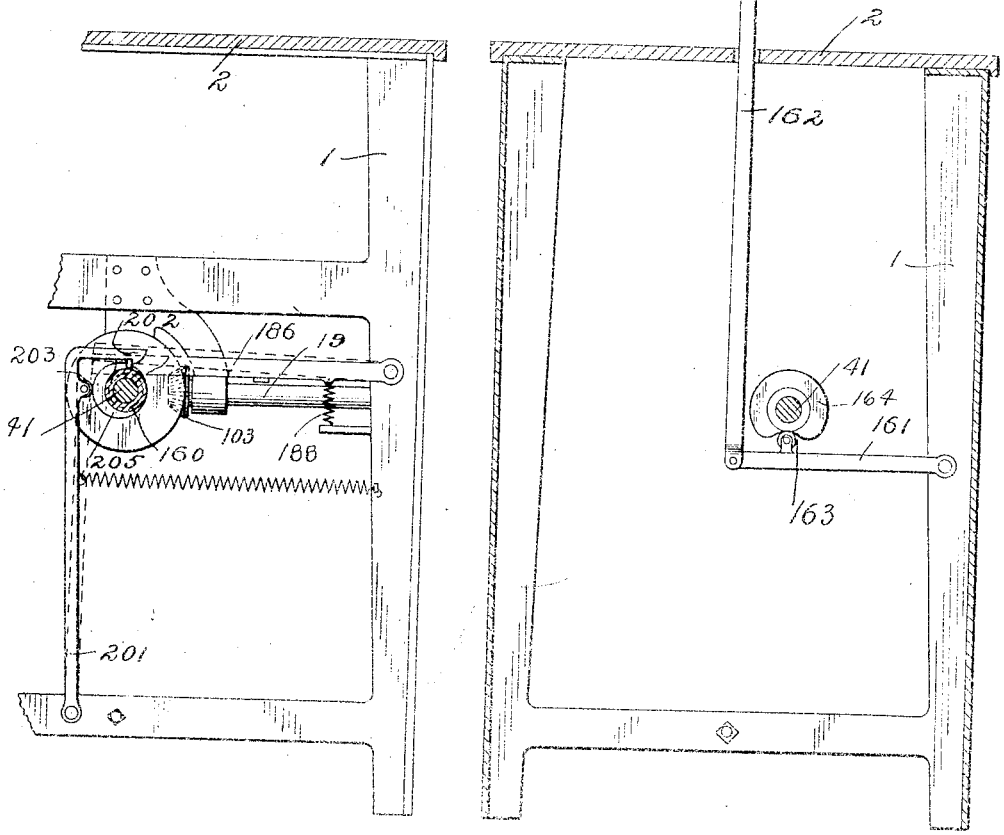

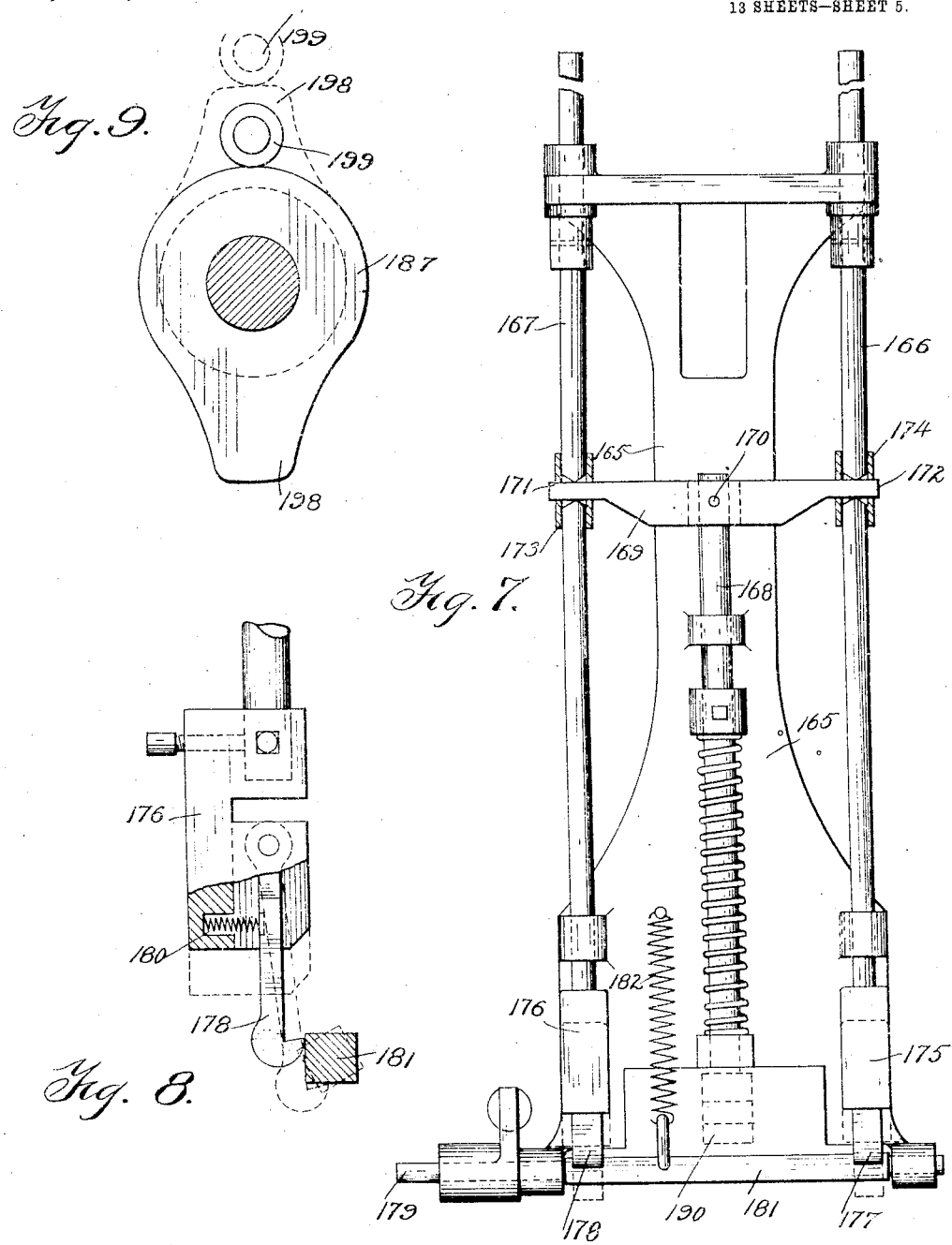

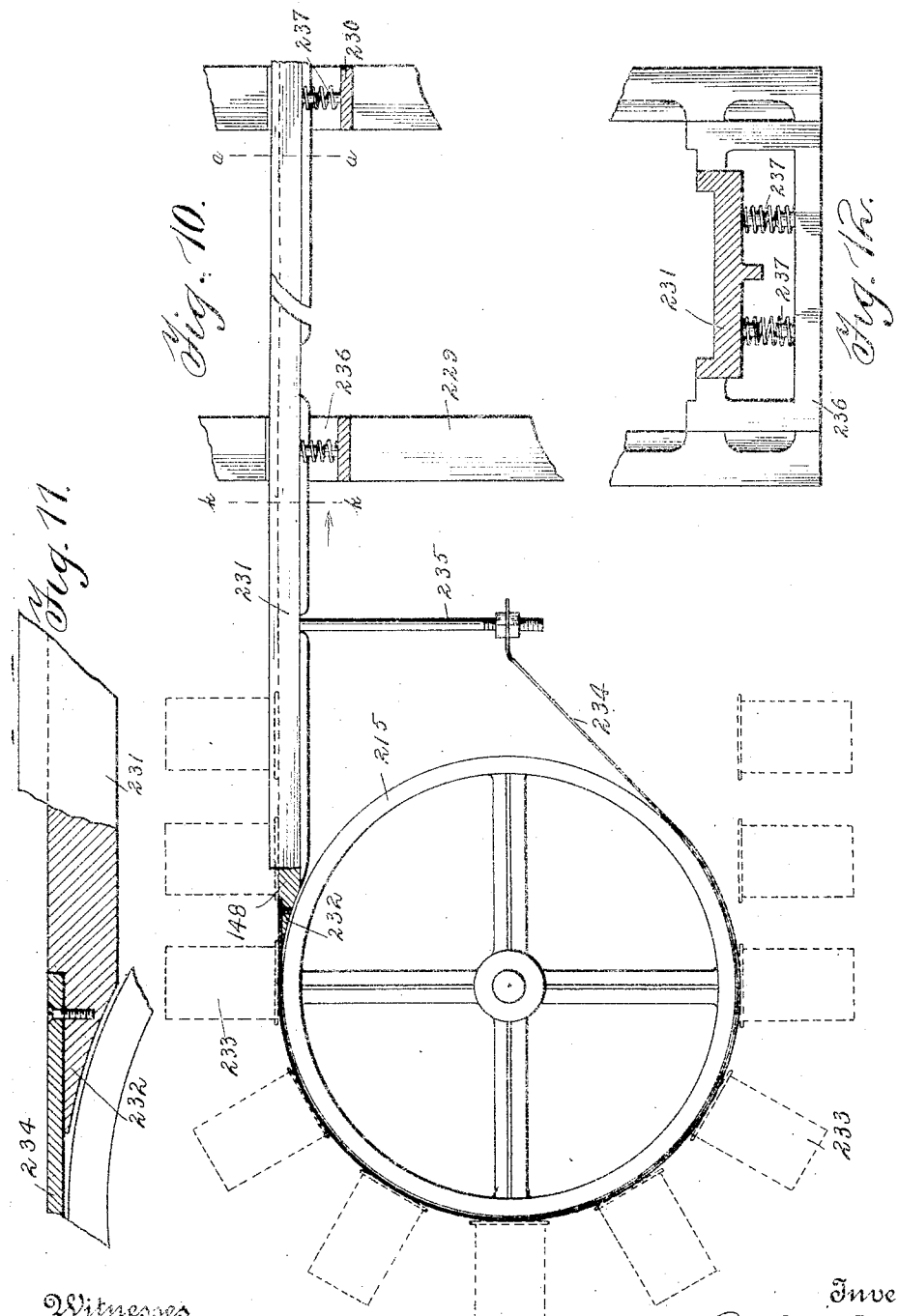

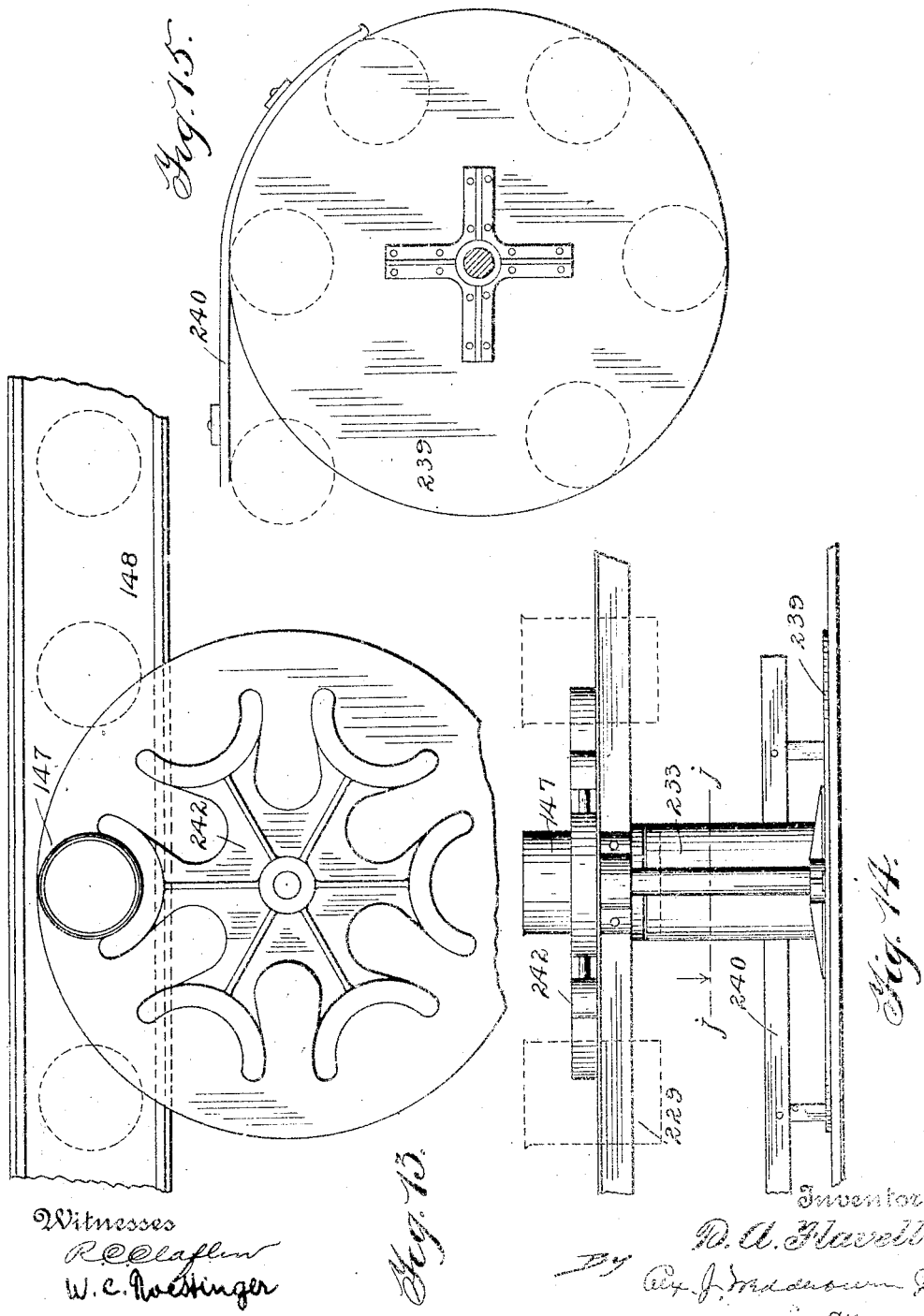

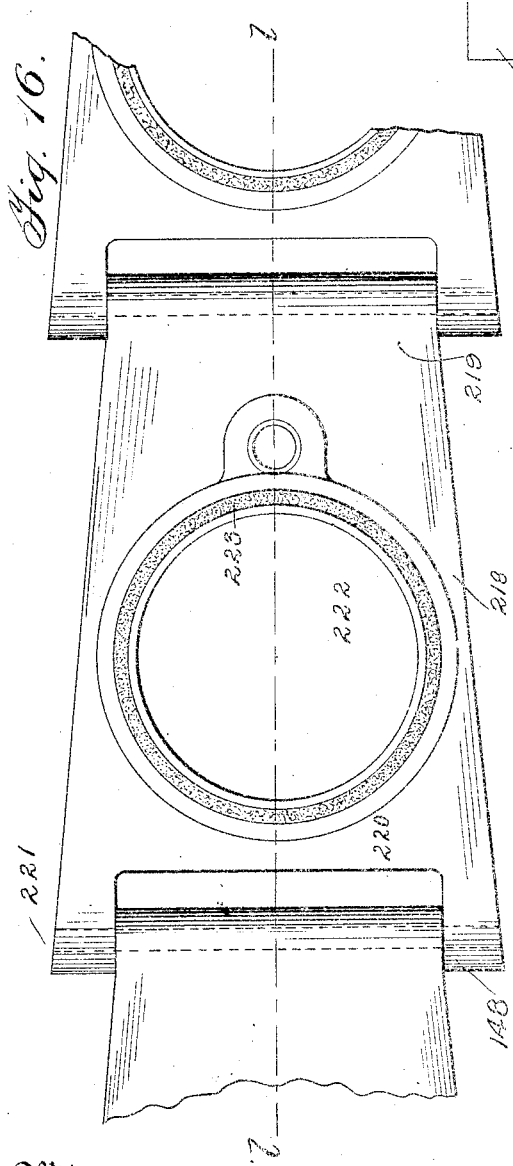
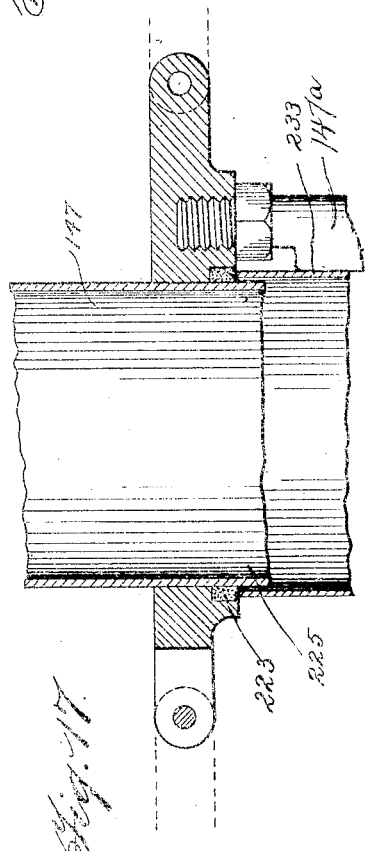
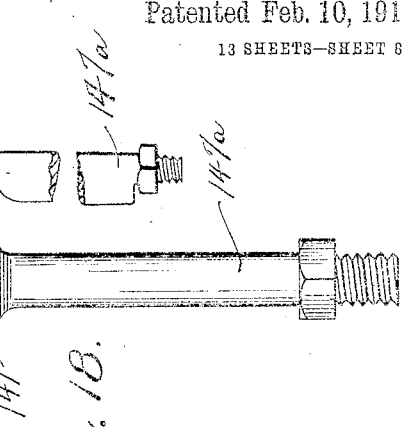

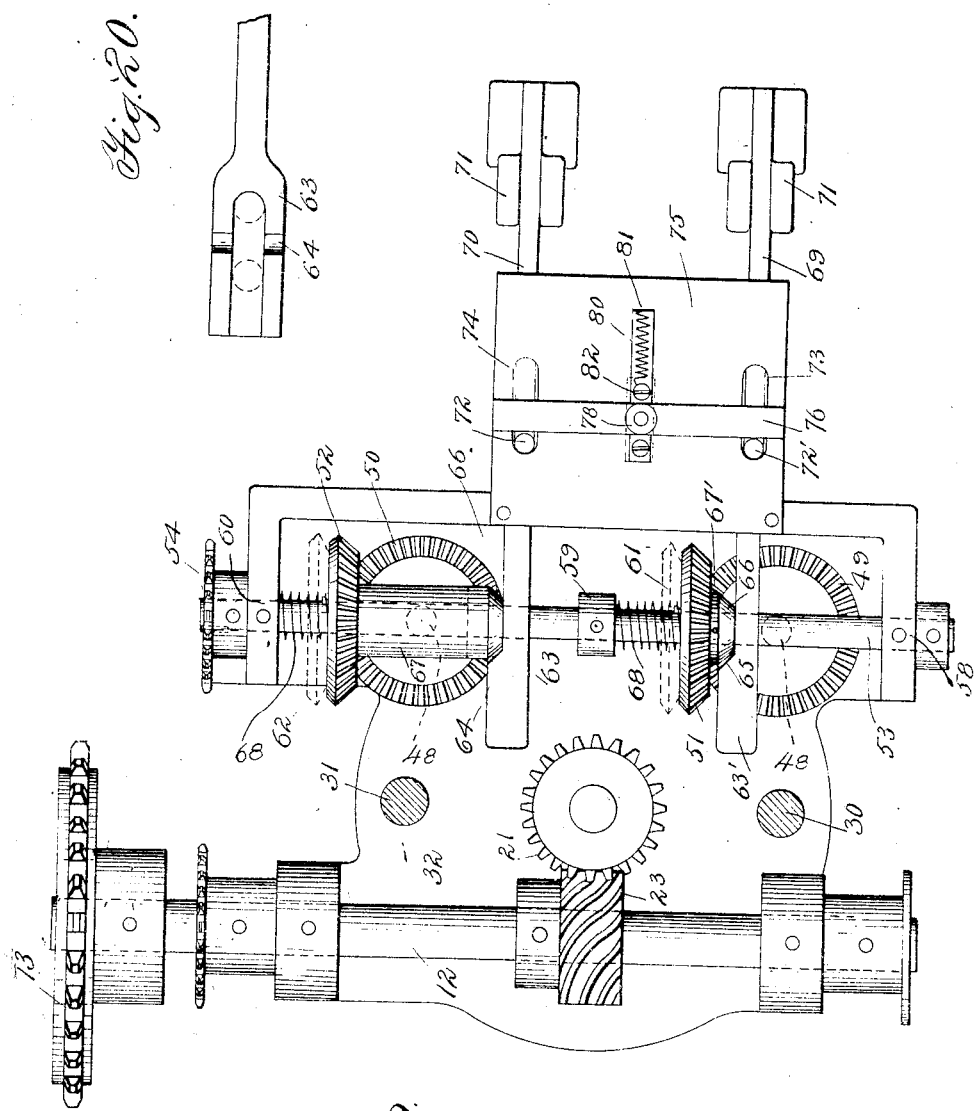

1,086,360.

Patented Feb. 10, 1914.
13 SHEETS—SHEET 10.

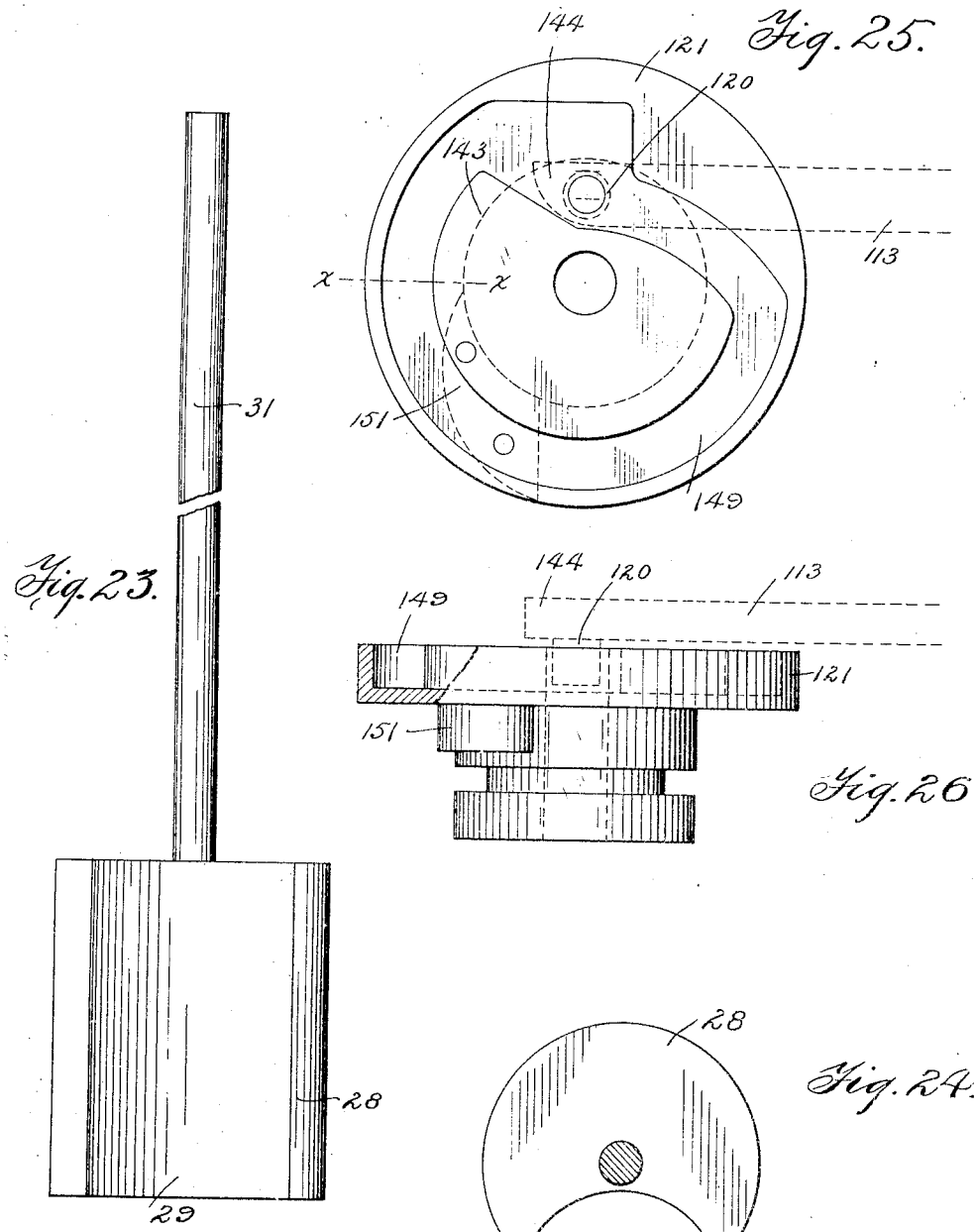

D. A. FLAVELL.
WEIGHING AND FILLING MACHINE.
APPLICATION FILED FEB. 21, 1911.
1,086,360.
Patented Feb. 10, 1914.
13 SHEETS—SHEET 12.
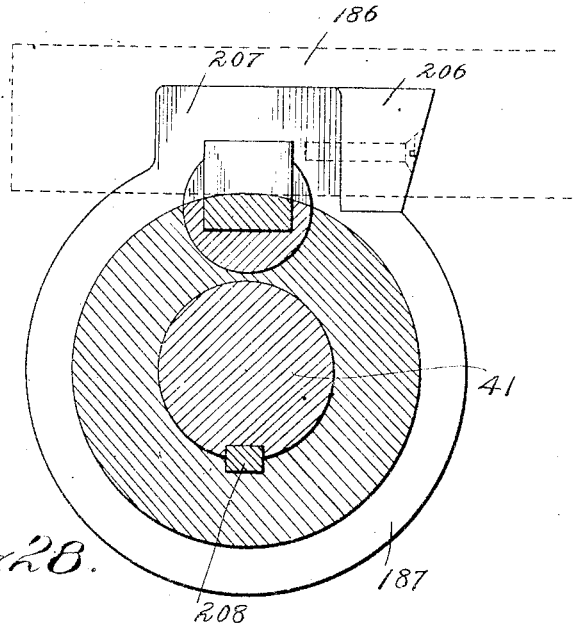
Fig.29. Fig.28.
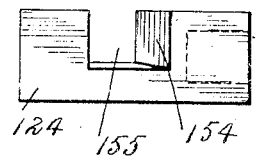
Fig.27.
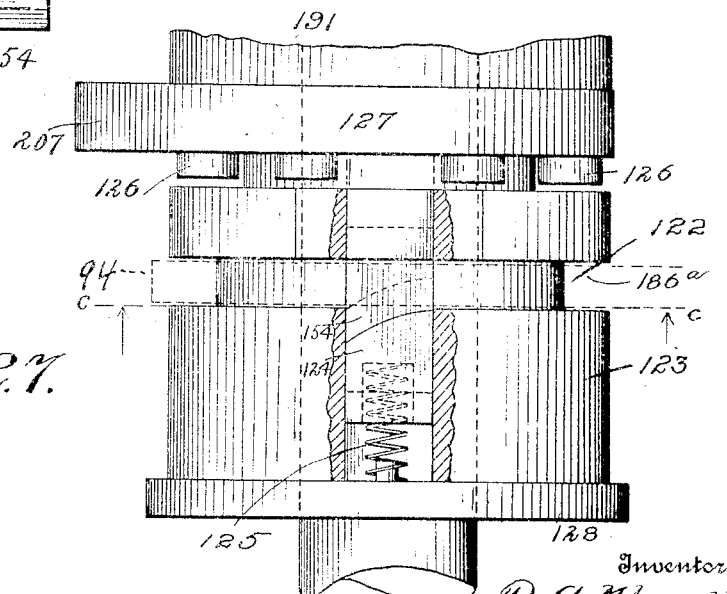
Witnesses
R. C. Claflin
W. C. Rottinger
Inventor
D. A. Flavell
By Alex J. Freudenberg Jr.
Attorney

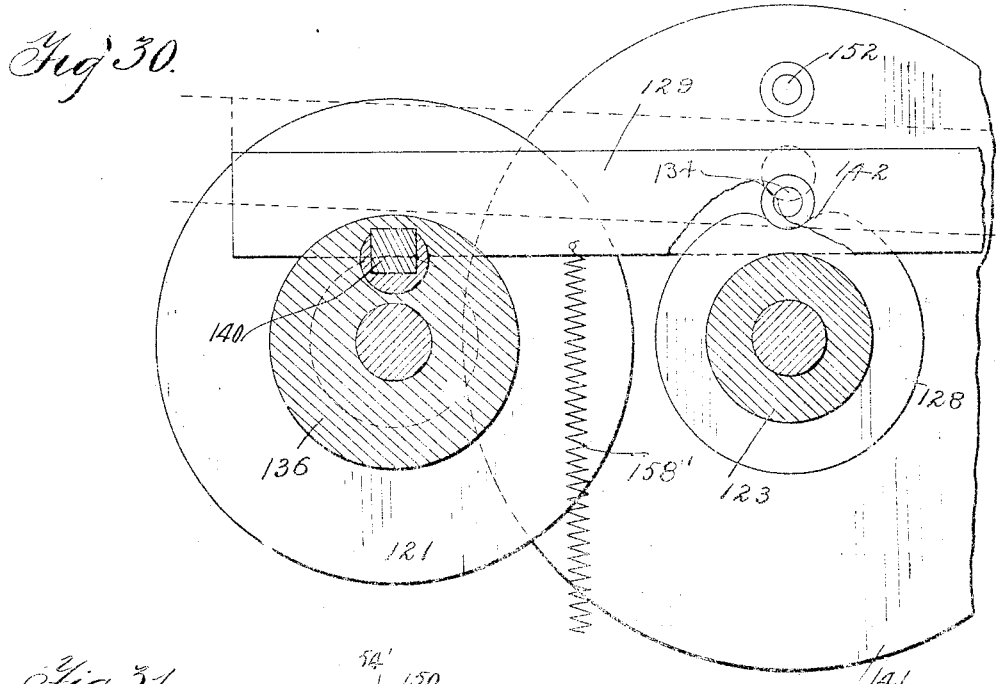
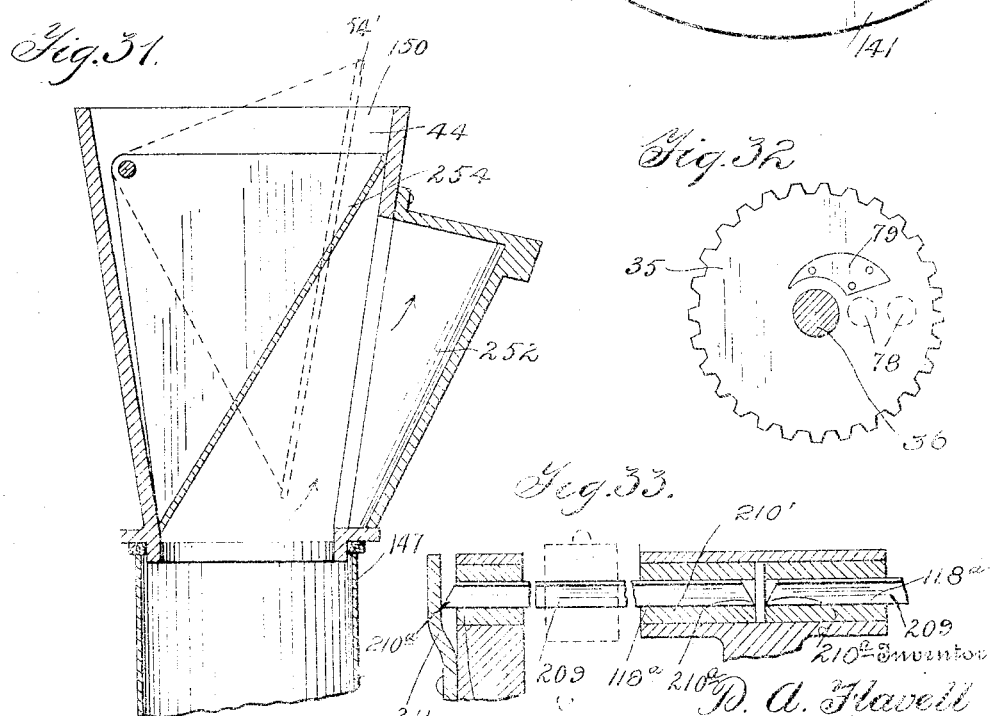

UNITED STATES PATENT OFFICE.

DENIS ALBERT FLAVELL, OF JERSEY CITY, NEW JERSEY.

WEIGHING AND FILLING MACHINE.

1,086,360.   Specification of Letters Patent.   Patented Feb. 10, 1914.

Application filed February 21, 1911. Serial No. 610,054.

*To all whom it may concern:*

Be it known that I, DENIS A. FLAVELL, citizen of the United States, residing at Jersey City, in the county of Hudson and State of New Jersey, have invented certain new and useful Improvements in Weighing and Filling Machines, of which the following is a specification.

This invention relates to improvements in an automatic weighing and filling machine, and the principal object of the invention is to provide a machine for accurately weighing a powdered or granulated substance and depositing same in cans or cartons.

Another object of the invention is to provide a machine for weighing a powder and depositing it in a can without trapping air thereinto. And another object is to provide a machine of the nature explained having automatic means for preventing the escape of the powder dust, which is very objectionable as well as amounting to a considerable loss where a large quantity of goods is handled.

Figure 21:
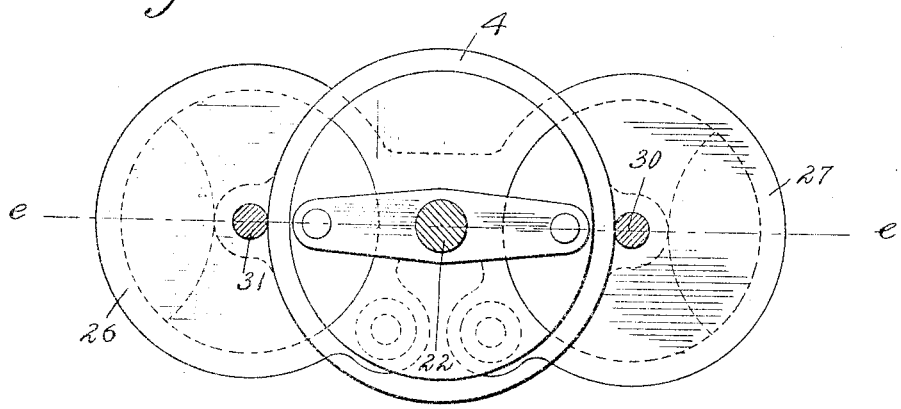
Figure 22:
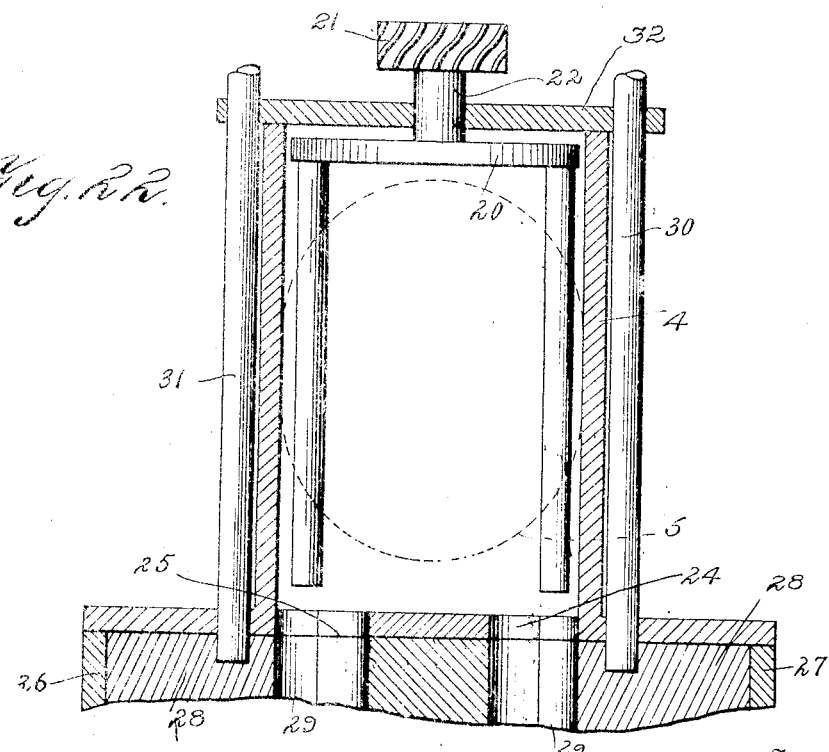

With the above and other objects in view I have invented the machine illustrated in the accompanying drawings in which, Figure 1 is a front elevation of my improved automatic machine, Fig. 2 is a side elevation thereof, taken partly in section, Fig. 3 is a partial top plan view, certain of the mechanism having been removed, Fig. 4 is a section on line *b—b* of Fig. 2, Fig. 5 is a sectional view on line *a—a* of Fig. 2, showing a detail of scale arm clamping device, Fig. 6 is a detail view of an electrical release device, Fig. 7 is a detail view of a clutch trip, Fig. 8 is a detail view of a trip hook member, Fig. 9 is a view of a trip hook releasing cam, Fig. 10 is a detail view of a portion of a cam carrying mechanism, Fig. 11 is an enlarged detail view of a portion of a slideway, Fig. 12 is a cross sectional view of the slideway, taken on line *h—h* of Fig. 10, Fig. 13 is a detail top plan view of a delivery wheel, Fig. 14 is a front view of Fig. 13, Fig. 15 is a sectional view taken on line *j—j* of Fig. 14, Fig. 16 is a detail of a portion of an endless can conveyer belt, Fig. 17 is a sectional view of Fig. 16 taken on line *l—l*, Fig. 18 is a detail view of a can securing member shown in a reversed position, Fig. 18ᵃ is a side elevation of Fig. 18 shown partly broken away and partly reduced in scale, Fig. 19 is a sectional view taken on line *g—g* of Fig. 2, looking down, the plan of a wheel above said section line being shown, Fig. 20 is a detail of a worm feed operating fork, Fig. 21 is a top view of a pair of filling hoppers with cover removed, Fig. 22 is a cross section of Fig. 21, taken on the line *c—c* with cover on, Fig. 23 is a detail view of a measuring block, Fig. 24 is a top view thereof, Fig. 25 is a detail view of a scale beam operating device, Fig. 26 is a bottom view of Fig. 25, Fig. 27 is a top view of a main clutch member taken partly in section to show operating slide, Fig. 28 is a cross sectional view on line *e—e* of Fig. 27, Fig. 29 is a detail view of a slide member, Fig. 30 is a sectional view taken on line *d—d* of Fig. 3 showing in detail the relation between the primary clutch and the secondary clutch, Fig. 31 is a central sectional view of a scale hopper, Fig. 32 is a bottom view of a gear member, and Fig. 33 is a sectional view of a fulcrum member for the scale arm, Fig. 34 is an enlarged detail view of an electric contact and its operating mechanism, Fig. 35 is a horizontal sectional view taken on the line A—A of Fig. 1.

Referring to the accompanying drawings 1 is a frame upon which is mounted a stand 2, and an upright support 3, to which are secured filling hoppers 4 by means of brackets 5. A chute 6 connects the filling hoppers with the supply source. In the mouth of this chute is secured on a revolving shaft 7, a forced feed device 8. A sprocket wheel 9 is fixedly mounted on the shaft 7 and is driven by a chain 10, which is operated by sprocket wheel 11 mounted on the shaft 12. On this shaft is also fixedly mounted a sprocket wheel 13 which is operated by the chain 14, this chain being driven by the sprocket wheel 15 on the shaft 16, which is driven by the sprocket chain 17 through the sprocket wheel 15′, this chain being in turn driven by the sprocket wheel 18 on the main drive shaft 19.

When the material enters the filling hopper 4 it is kept from packing there by means of agitators 20, which are revolving continuously while the machine is in operation, by means of a spiral gear 21, which is connected to the agitator by the shaft 22 and is operated by the spiral gear 23 on the shaft 12.

Below, and connected to the filling hopper 4 by means of openings 24 and 25 are a pair of cylindrical measuring chambers 26 and 27, in each of which is located a measuring block 28 having a cutaway portion 29, which on every complete revolution of the block comes directly below the openings 24 or 25 respectively and is adapted to receive the material from the filling hopper. These blocks are of a size to completely fill the measuring chambers, except for the cut-away portions in the blocks, which are adapted to receive and hold as nearly as possible, the amount of material with which it is desired to fill a can or carton. Fixedly secured to these blocks are shafts 30 and 31 which pass through the plate 32, and on the upper ends of which are mounted intermeshing gear wheels 33 and 34, one of which meshes with, and is operated by an intermediate gear 35, which is mounted on a shaft 36. This intermediate gear is driven by a gear 37 mounted on a shaft 38, on the lower end of which is mounted a bevel gear 39, which meshes with a mutilated gear 40. This gear is so arranged as to operate the shaft 38 and all of its connecting gears and shafts, intermittently. The gear 40 is mounted on a shaft 41, the operation of which will be explained later.

The gearing which operates the shafts 30 and 31 is so arranged that the blocks 28 are given a half revolution, and are then stopped, with the cutaway portions directly under the openings 24 and 25 and remain stationary while these portions are being filled with the material from the filling hopper. At the proper time, another half revolution is imparted thereto, when the cutaway portions 29 aline with the openings in the bottom 42 of the chambers 26 and 27, which openings are directly over funnels 43, which enter the scale hoppers 44 and 45, when they are in a raised position to receive the load, as shown in Fig. 2. Small cylindrical by-passes 46, which are formed by offsets on the chambers 26 and 27, connect the hopper 4, with the scale hoppers 44 and 45. Operating in these by-passes are screw conveyers 47 which are secured to shafts 48 on the upper ends of which are mounted bevel gears 49 and 50, which mesh with bevel gears 51 and 52, mounted on the shaft 53. This shaft has mounted thereon a sprocket wheel 54, which may be splined to said shaft 53 and which is operated by a sprocket chain 55, driven by the sprocket wheel 56 on the shaft 57. The shaft 53 is mounted on its bearings, 58, and 60, and the bevel gears 51 and 52 are slidably mounted on this shaft, so that they may be unmeshed from the bevel gears 49 and 50, as shown by dotted lines 61 and 62, by means of forks 63 and 63', the free ends of which are widened and have beveled portions 64 and 65, which operate against the bevel portion 66 of the collars 67 and 67'. 59 is a collar serving as an abutment for the spring 68. These collars are fixedly secured to the bevel gears 51 and 52 and when the forks are drawn rearwardly, the beveled portions of the forks operating against the beveled portions of the collars, force the collars and the bevel gears which are affixed thereto, to shift their position, as shown in dotted lines. When the forks are forced forward the springs 68 pressing against the gears 51 and 52, force them to again shift their position and bring the gears 51 and 52 into mesh with the gears 49 and 58, causing them to rotate the screw conveyers. These forks operate independently of one another so that either of the screw conveyers may continue in operation after the other one has been stopped. These forks are integral with the arms 69 and 70 which are pivotally connected to levers 71.

On the arms 69 and 70 are pins 72' and 72 which extend upwardly through the slot 73 and 74 in the plate 75. A cross arm 76 engages both of the pins 72', and 72 at certain times to force the forks 63 and 63' out of engagement with the collars 67 and 67', thus permitting the gears 50 and 52, 49 and 51 to mesh simultaneously, in order to start both screw conveyers into operation at the same moment. Upon the cross arm 76 is a bracket 77, upon which is mounted a roller 78. This roller contacts a cam 79 on the under side of the gear 35, as shown in Fig. 32. A revolution of the gear 35 causes the cam 79 to engage the roller 78 and draws the bracket 77, which is fixedly secured to the cross arm 76, forward, thus causing the forward movement of both of the forks 63 and 63' simultaneously. A spring 80, secured at one end to the rear end 81, of the plate 75, and at its other end to a member 82 fixed to the arm 76, is adapted to immediately draw the said arm rearwardly and out of contact with the pins 72' and 72, thus leaving the arms 69 and 70 free to be drawn rearwardly, independently of one another.

Secured to the support 3 are brackets 83, which act both as supports and as fulcrums for the levers 71, to the lower ends of which are connecting bars 84, the other ends of which are pivoted to the bell cranks 85. These cranks are mounted on a shaft 86 which is journaled on the shaft supports 86'. Between the upper end of the bell cranks and their mounting are pivoted rods 87, the other ends of which are secured to the cut-off slides 88, which are adapted to instantly cut off the supply of material from the passages 46 when the scale beams tip under their exact load.

Mounted on the stand 2 is a support 89 near the upper end of which is secured a bracket 90, having arms between which is slidably mounted a rod 91, having a trip 92 on the lower end thereof. On the bracket 90 is also an arm 90' to which is fastened one end of a spiral spring 93, the other end of which is secured to one of the free ends of the levers 94 or 95. There is one set of the above members operating in connection with each scale beam 113 and 114.

To the rods 91 are connected wires 96 leading to an electric source, and on the rods 87 are mounted electrical conducting members 97 to which are connected conducting wires 98, the other ends of which connect to magnets 99 supported in a box 100, mounted on the brackets 101 and secured to the magnets are wires 102 leading to the supply source. In one side of the magnet box are mounted armatures 103 and 104, the supports of which are provided with pins 105 and 106 operating in slots in the bearings 107. A spring member 108 operates against the pins 105 and 106, tending to hold the armature supporting rods 109 and 110 normally projecting through the side of the box. A tension adjusting device 112 is located within the box by means of which the tension of the spring 108 may be easily regulated.

When the scale hoppers receive their correct load and tip the scale beams 113 and 114, lugs 115 on the rear part of the beams contact the lower ends of the rods 91 and force them up, causing the upper ends of said rods, which are preferably of copper, to contact the members 97 closing the electric circuit and causing the magnets to attract the armatures, thus drawing in the rods 109 and 110, which release the rods 116; which are mounted on the free ends of the levers 94 and 95, allowing the springs 93 to raise these levers. At the same time that the rods 91 are raised the trip members 92 trip the catches 117 from the ends of the supports 89, thus allowing the springs 118 to draw the rods 84 forward, moving the upper arms of the bell cranks forward, and forcing the rods 87 forward, thus closing the lower openings of the screw conveyer chambers or bypasses 46 by forcing thereunder the slides 88. The same action of the spring 118 causes the rods 84 to drive forward the lower arm of the levers 71 thus drawing the upper portion thereof rearwardly and they in turn draw the arms 69 and 70 rearwardly, disconnecting the gears on the shaft 53.

As the above operation is controlled by the scale beams which work independently of one another, one scale hopper may be preparing to deliver its load, while the other one is yet receiving its load.

When the cam 79 on the gear 35 draws the arms 69 and 70 forward, the actions of the various members are just the reverse of that above described and the hooks 117 drop into place over the ends of the supports 89, thus again rigidly setting these members. In the meantime the rear ends of the scale beams have again been lowered, allowing the rods 91 to drop to their normal positions and breaking the electric circuits, the levers 94 and 95 having dropped and the rods 116 being again locked down by the supporting rods 109 and 110.

The mechanism for locking the scale hoppers in rigid connection with the cans to be filled, will now be described. The shaft 16 is constantly revolving, and the shaft 57 is also constantly revolving, the first shaft making three revolutions to one revolution of the latter shaft. The scale beams are operated in precisely the same manner and the operation of one only will be described. These scale beams are supported on knife edges 118ª, mounted on brackets 119 and have mounted on their rear ends rollers 120, which engage cam wheels 121. When the lever 94 is raised by the spring 93, it is withdrawn from a peripheral slot 122 in a primary clutch 123, loosely mounted on the shaft 16. This releases a locking pin 124 which is forced forwardly by a spring 125 and is engaged by the pins 126 on the clutch member 127, which is fixedly secured to the shaft 16 and revolves continuously, thus causing the clutch and the cam wheel 128 to revolve. The lever 129 pivoted on the shaft 130, which is mounted on the brackets 132 and 133 on the stand 2, is provided with a roller 134 on one side thereof, which normally rests in the reduced portion 142 of the cam wheel 128. However, when this wheel revolves it raises the free end of the lever from the slot 135 in the secondary clutch 136, loosely mounted on the shaft 57. This releases a pin 140 similar in construction and operation to the pin 124. This pin locks the clutch to the clutch member 137 by means of the pins 138. This clutch member is fixedly secured to the shaft 57 and rotates continuously, the rotation of the shaft causing the clutch 136 and the primary cam wheel 121, to which said clutch is fixedly secured to rotate. When this cam wheel rotates, the cam 143 instantly raises the rear end 144 of the scale beam 113, and forces the forward end holding the scale hopper down, and rigidly holding the outlet 145 of the scale hopper down into the funnel 147 on the endless conveyer belt 148 and continues to hold it in this position as long as the roller 120 remains in the circular course or runway 149. As soon as the angular portion of the course is reached the rear end of the scale beam is again allowed to drop, thus raising the forward end thereof, and bringing the mouth 150 of the scale hopper into position to receive its next load. On the opposite side of the cam wheel 121 is a cam 151, the function of which will be explained later.

Fixedly secured to the primary clutch 123 is a cam operating wheel 141 which carries a roller 152. This engages the cam 153 on the lever 94, and forces that lever down into the groove 122 in the primary clutch, when the lever abuts the cam surface 154 in the groove 155 of the pin 124, when in the position shown in dotted lines in Fig. 27, and forces the pin into the position shown in full lines and out of engagement with the clutch member 127. A dog 156 on the shaft 130 engages the notch 157 in the wheel 141 and prevents the friction of the shaft 16 from rotating the clutch and holds it in a normal position for the next operation. The lever 129 is provided with a spring 158', which forces said lever to operate the pin 140, thus releasing the clutch 136 from the continuously revolving wheel 137. The clutches 123, 136, 158, 159 and 160 are similar in construction and operate in precisely the same manner.

A pivoted lever arm 161 having a roller 163 thereon is secured at one end to the frame 1 and has pivoted to its other end a T-shaped clamping arm 162, which is adapted to clamp down on the scale beams in the rear of the fulcrum and thus force the forward ends of the scale beams up, so as to hold the scale hoppers in rigid connection with the measuring chambers. This clamping device is operated by a cam wheel 164 on the shaft 41. Between the mouths of the scale hoppers and the outlets from the measuring chambers, are located rubber gaskets, which hermetically seal the connections and prevent the escape of any of the material or dust therefrom. Supported from the under part of the stand 2 is a hanger 165, upon which are slidably mounted rods 166 and 167 which are held in a normally raised position by means of a spring operated rod 168, which is connected to them by the cross bar 169. This bar is pivoted at 170 to the upper end of the rod 168, and has its free ends 171 and 172 held in sockets 173 and 174 which are so constructed as to permit of a vertical movement of the bar. The sockets 174 and 173 are fixedly secured to the rods 166 and 167. The ends of these rods 166 and 167 are seated in members 175 and 176, which are mounted above a shaft 179 and carry hooks 177 and 178. These hooks are pushed forward by springs 180 and are adapted to engage the square center portion 181 of the shaft 179. A spring 182 is adapted to hold the shaft 179 in the normal position shown in Fig. 8 in full lines. The hanger 165 has a rearwardly projecting arm 183 to which a lever 184 is pivoted, the end 185 of which extends under the lever 186, which is pivoted to the frame 1; and the free end of which is adapted to rest normally in the groove 186ª in the main clutch 160, and hold the pin 124 thereon, out of engagement with the continuously revolving cam wheel 187. A spring 188 holds the lever 186 in normal engagement with the clutch 160.

When the cam 151 on the primary cam wheel 121 reaches an extremely low position in its revolution, it contacts and forces down the rod 167 causing the hook 178 to engage squared portion 181 of the shaft 179 which will hold the rod down until released. This movement forces one arm of the cross bar 169 down and when the cam 189 on the primary cam wheel 121 reaches its lowermost position it engages and forces down the rod 166, causing the hook 177 to engage under the squared portion 181 of the shaft 179. The downward movement of the rod 166 forces down the other end of the cross bar 169, which forces down the bar 168 causing it to force down the rear end 190 of the lever 184, and forcing up its forward end, which in turn forces up the lever 186. This permits the pin 124 in the main clutch to engage the constantly revolving cam wheel 187 which is integral with a collar 191 on which is mounted a bevel gear 192, which is driven by a bevel gear 193. The collar 191 is loosely mounted on the free end of the shaft 41. A clutch 160 on the shaft 41 is provided with a projecting cam wheel 198 which engages a roller 199 on the lever 200 causing it to turn shaft 179 thus releasing the hooks 177 and 178 and allowing the rods 166 and 167 to resume their normal positions.

It will be seen from the foregoing that both scale hoppers will be in connection with the measuring chambers before the shaft 41 is connected up to the driving shaft 19 and started to rotate and operate the mechanism which fills the scale hoppers.

On the extreme forward end of the shaft 41 is a gear 194 which meshes with and operates a large gear 195 which is fixedly mounted on a shaft 196. This shaft operates the endless conveyer belt 148 which conveys the cans 233. The belt must operate so that the cans will come directly under the outlets 145 of the scale hoppers so that the material therein may be deposited directly into the cans, therefore, in order to make a nice adjustment of these members, I have provided a centering device, constructed as follows: Pivoted to the frame 1 is a lever 201 having a right angular hook 202 on its free end and a roller 203 near its upper end. This contacts the cam wheel 205, causing the lever 201 to be constantly forced out beyond the extreme cam extension thereon. This causes the hook 202, which engages the steel abutment 206, resting against the lug 207 to constantly draw the wheel 187 and consequently the shaft 41 to which it is secured by a key 208, to a position which will cause the funnels 147 to stop and remain directly under the outlets 145 of the scale hoppers. The knife edges 118ª for the scale arms are V-shaped and their sharp edges 209 only bear upon the supporting members 210'. The ends of the members 209 project beyond the body of the members 210' forming points 210ª at their outer ends which engage the arms 211. This construction forms a very sensitive balance and will tend to operate the cut-off mechanisms immediately the correct weight of material is received into the scale hopper. Weights 212 are slidably secured to the scale arms by means of which the scale arms may be made to weigh and then deposit into cans or cartons any desired quantity of material. Secured to the upper parts of each of these weights is an arm 213 which is screw threaded and screwed off-center upon this arm is a small balance 214 by means of which the scales may be very nicely adjusted. This weight is screwed off-center so that the heavier portion will remain down and any movement of the machine will not tend to shift it out of its desired position as it automatically holds itself in its desired position.

Mounted on the shaft 196 is a base wheel 215 having fixedly secured to each side thereof, sprocket wheels 216 and 217, which are of greater diameter than the base wheel. The conveyer belt is constructed in the manner shown in Fig. 16 and is in the form of a sprocket chain and consists of a series of steel plates 218 having a reduced forward portion 219, and an enlarged rear portion 220, which is cut away to receive the reduced end of the following plate. Bolts 221, pivotally connect the plates. An opening 222 is formed in each plate and a funnel 147 is fixed in each of these openings and passes through the plate. A gasket 223 is fitted into a recess on the under side of each plate contacting the funnel. The bolts 221 extend beyond the small ends of the link plates on each side and are adapted to be engaged by the sprockets 224 on the sprocket wheels 216 and 217. A funnel 147 having a can engaging portion 225 is secured to each of the link plates 218 in such a position that it will contact a can and hold it in an upright position on the conveyer belt. In each of the links 218 adjacent the can engaging portion 225 of the funnel is secured a member 147ª, having a curved end 147ᵇ adapted to engage a can 233 and hold it pressed frictionally against said funnel so it will not drop from the funnel of its own weight. This member is shown only in one instance in Fig. 17, it being thought unnecessary to show it in connection with every can.

Situated at a proper distance from the sprocket wheels 217 and 218 and on a direct line therewith is another pair of co-acting sprocket wheels 226 on which the conveyer belt 148 is rotated. The wheels 226 are mounted on a shaft 227 journaled to a journal support 228. A frame work 229 is also fixed to this support and to the main frame, from which is supported a delivery table 230. Supported on a line with the extreme uppermost portion of the base wheel 215 is a slideway or delivery chute 231, having upwardly extending flanges. The end 232 of this slideway is beveled so that the extreme end thereof will extend partially above the base wheel. A sleeve shaped band 234 is secured to the top of the end of the slideway and passes nearly around the base wheel. This has its other end held by the rod 235. The bottom of the cans 233 carried by the endless belt conveyer slide over this band and are guided thereby onto the slideway 231. The slideway is mounted in supporting members 236 on the frame work 229 and is supported by the springs 237. The rear end 238 of the slideway inclines downward and rests on the table 230 in such a manner as to guide the cans 233, which in descending the inclined portion of the slideway have by their weight released themselves from the funnels 147, onto a rotary disk 239, where they are kept from sliding off said disk by a guide member 240. The disk is revolubly mounted on the table 230 being mounted on a shaft 241 which carries a sprocket wheel 242 at its upper end. This sprocket is engaged by the funnels 147 on the conveyer belt 148, which as they move along, rotate the shaft, sprocket and disk 239, which carries the can to the point of delivery.

A member 243 hinged to the stand 2 and having a pair of openings therein to fit over the funnels and carrying rubber gaskets 244 thereon is adapted to hermetically seal the connection between the funnels and the scale hopper delivery openings 145, to prevent the escape of the powder dust when the contents of the scale hopper is being deposited into the funnels. A spring 246 holds the member 243 out of contact with the funnels. When the cans 233 are placed on the funnels 147 down side up, as shown at 233' in Fig. 1, the belt conveys them to the wheel 215, and as they pass around this wheel the mouths thereof are compressed tightly against the gaskets 223, by means of the slideway 224 on the wheel 231, thus preventing the escape of dust when the material is being deposited in the cans. A sprocket chain 247 engages a sprocket wheel 248 having pins thereon. This agitates tappers 249 pivoted to the frame 1, held normally up by a spring 250, which is adapted to settle the material into the filled cans which stop for a short period directly over the tappers. The same sprocket chain 247 operates tappers 251 which are adapted to loosen any material in the scale hoppers when they are delivering the load and force any air which may have been collected therein to pass up and through the air chute 252 as shown by the arrows in Fig. 31. The sprocket chain 247 is driven by a sprocket mounted on the shaft 16. When the scale hoppers descend a guide arm 253 is adapted to direct the openings 145 therein into the mouths of the funnels.

Pivoted sealing members 254 are located in the scale hoppers and held normally closed, as shown in Fig. 31, by means of a rod 255 which is held normally down by a spring 256, however when the scale hopper goes down a fixed hook 257 which engages the rod 256 causes it to raise this rod, thus raising the seal and releasing the material in the hopper as shown in dotted lines in Fig. 31.

The operation of the machine is as follows: Material from the hopper 4 is fed into the opening 29 in the members 28 in cylinders 26. As the members 28 rotate they discharge their loads into the scale hoppers. As the loads are slightly insufficient to overbalance the scales, the auxiliary feeds deliver very small streams of material into the scale hoppers until the exact weight which the machine has been adjusted to weigh, is delivered to the scale hoppers, whereupon an electric circuit is closed which instantly cuts off the auxiliary feed. The scale beams holding the scale hoppers are tipped hermetically sealing the delivery mouths to the funnels through which the material is delivered to the cans. Cam operated lock arms engage the forward part of the scale beams and hold the scale hoppers in rigid connection with the funnels until every particle of their contents have been emptied into said cans. Tappers hitting against the hoppers dislodge every particle of the contents thereof. When the scale hoppers overbalance the scale beams, the rear ends thereof are forced up which causes the rotating clutches to engage wheels having cams thereon which are adapted to raise the levers 129, this causes a cam to engage the rear of the scale arms and hold them in a raised rigid position whereby the scale hoppers are held in fixed engagement with the funnels holding the cans to be filled. The same operation which raises the lever causes cams to operate rods which in turn operate a clutch on the shaft 41 which throws it into or out of rotation. On this shaft is a cam wheel which is adapted to operate a rod with cross arms thereon which is adapted to engage the scale beams and bear down on the rear portion thereof causing the mouths of the scale hoppers to be hermetically sealed against the delivery chambers. The same shaft 41 has a mutilated gear thereon which is adapted to engage the vertical shaft 38 at the same time the hoppers are sealed to the delivery chambers, said shaft 38 being geared with shafts which operate the members 28 which deliver the loads to the scale hoppers. The rotation of the shaft 41 while operating the vertical shaft 38 also operates a shaft on which is mounted the sprocket wheels which drive the endless chain conveyers thereby moving the filled cans while a load is being delivered to the scale hoppers and bringing the emptied cans into position to receive the next loads.

I claim and desire to secure by Letters Patent:—

1. In a weighing and filling machine, scale hoppers commonly operated, means for delivering approximate loads to said hoppers independently, means by which the loads in said hoppers may be augmented independently, means for delivering the loads from said hoppers simultaneously, funnels for receiving said loads and means whereby said hoppers may be independently lowered to receive said funnels.

2. In a weighing and filling machine, scale hoppers commonly operated, means for delivering approximate loads to said hoppers independently, means by which the loads in said hoppers may be augmented independently, means for delivering the loads from said hoppers simultaneously, funnels for receiving said loads, means whereby said hoppers may be lowered to receive said funnels, and means for binding said hoppers to said funnels after both of said hoppers have been lowered.

3. In a weighing and filling machine a weighing and filling hopper, a conveyer conveying cans to said hopper, means for sealing the connection between said cans and said conveyer, said means consisting of a slideway comprising a metal band.

4. In a weighing and filling machine a weighing and filling hopper, a conveyer conveying cans to said hopper, means for sealing the connection between said cans and said conveyer, said means consisting of a slideway comprising a metal band, a wheel on which said band is mounted.

5. In a weighing and filling machine a weighing and filling hopper, a conveyer conveying cans to said hopper, means for sealing the connection between said cans and said conveyer, said means consisting of a slideway forming an arcuate course.

6. In a machine as described a weighing and filling hopper, a conveyer conveying cans to said hopper, means for sealing the connection between said cans and said conveyer, said means consisting of a slideway forming an arcuate course, said slideway then taking a horizontal course.

7. In a machine as described a weighing and filling hopper, a conveyer conveying cans to said hopper, means for sealing the connection between said cans and said conveyer, said means consisting of a slideway forming an arcuate course, said slideway then taking a horizontal course and terminating in an incline course.

8. In a weighing and filling machine, a weighing hopper, an endless conveyer chain belt for conveying cans, means on said conveyer for sealing the mouths of said cans to said conveyer, said sealing means consisting of gaskets on said belt, means for pressing the mouths of said cans against said gaskets, said means consisting of a slideway adapted to bind said cans against said belt, and means for holding said cans on said belt and means whereby said hopper will cause the actuation of said conveyer.

9. In a weighing and filling machine, a weighing hopper, an endless conveyer chain belt for conveying cans, means on said conveyer for sealing the mouths of said cans to said conveyer, said sealing means consisting of gaskets on said belt, said means pressing the mouths of said cans against said gaskets, said means consisting of a slideway adapted to bind said cans against said belt, means for holding said cans on said belt, said means adapted to hold said cans in a vertical position and means whereby said hopper will cause the actuation of said conveyer.

10. In a weighing and filling machine, a weighing hopper, an endless conveyer chain belt for conveying cans, means on said conveyer for sealing the mouths of said cans to said conveyer, said sealing means consisting of gaskets on said belt, means pressing the mouths of said cans against said gaskets, said means consisting of a slideway adapted to bind said cans against said belt, means for holding said cans on said belt, said means adapted to hold said cans in an inverted vertical position, and means whereby said hopper will cause the actuation of said conveyer.

11. In an automatic weighing and filling machine, a weighing hopper, an endless conveyer belt, sprocket wheels for driving said belt, funnels carried by said belt and passing therethrough, said funnels adapted to carry cans placed thereon, means for sealing said cans to said belt, means for holding said cans on said belt, a slideway upon which said cans are moved, and a curved slideway for guiding said cans onto said slideway, and means whereby said hopper will cause the actuation of said conveyer.

12. In an automatic weighing and filling machine, a weighing hopper, an endless conveyer belt, sprocket wheels for driving said belt, funnels carried by said belt and passing therethrough, said funnels adapted to carry cans placed thereon, means for sealing said cans to said belt, means for holding the cans on said belt, a slideway upon which said cans are moved, a curved slideway for guiding said cans onto said slideway, means for loading said cans, and means whereby said hopper will cause the actuation of said conveyer.

13. In an automatic weighing and filling machine, an endless conveyer belt, sprocket wheels for driving said belt, funnels carried by said belt and passing therethrough, said funnels adapted to carry cans placed thereon, means for sealing said cans to said belt, means for holding the cans on said belt, a slideway upon which said cans are moved, a means for guiding said cans onto said slideway, a means for loading said cans, an independent member for sealing the connection between said funnels and said loading means, said loading means adapted to cause the actuation of said conveyer.

14. In an automatic weighing and filling machine, an endless conveyer belt, sprocket wheels for driving said belt, funnels carried by said belt and passing therethrough, said funnels adapted to carry cans placed thereon, means for sealing said cans to said belt, means for holding the cans on said belt, a slideway upon which said cans are moved, a means for guiding said cans onto said slideway, a means for loading said cans, a means for sealing the connection between said funnels and said loading means, and a tapper for settling the load in said cans, said loading means adapted to cause the actuation of said conveyer.

15. In an automatic weighing and filling machine, means for automatically depositing a desired load into cans, a tapper for settling said load in said cans, a means for permitting air to pass from said can, said loading means adapted to cause the actuation of said conveyer.

16. In an automatic weighing and filling machine, an endless conveyer belt, sprocket wheels for driving said belt, funnels carried by said belt and passing therethrough, said funnels adapted to carry cans placed thereon, means for sealing said cans to said belt, means for holding the cans on said belt, a slideway upon which said cans are moved, a means for guiding said cans onto said slideway, a means for loading said cans, an independent means for sealing the connection between said funnels and said loading means, a means for settling the load in said cans, and a means for stopping said cans over said settling means, said loading means adapted to cause the actuation of said conveyer.

17. In an automatic weighing and filling machine, an endless conveyer belt, sprocket wheels for driving said belt, funnels carried by said belt and passing therethrough, said funnels adapted to carry cans placed thereon, means for sealing said cans to said belt, means for holding the cans on said belt, a slideway upon which said funnels are moved, a means for guiding said cans onto said slideway, a means for loading said cans, a separable means for sealing the connection between said cans and said loading means, a means for settling the load in said cans, said slideway having an inclined position, said loading means adapted to cause the actuation of said conveyer.

18. In an automatic weighing and filling machine, an endless conveyer belt, sprocket wheels for driving said belt, funnels carried by said belt and passing therethrough, said funnels adapted to carry cans placed thereon, means for sealing said cans to said belt, means for holding said cans on said belt, a slideway on which said funnels are moved, a means for guiding said cans onto said slideway, a means for loading said cans, an independent means for sealing the connection between said cans and said loading means, a means for settling the load in said cans, said slideway having an inclined position, said loaded cans adapted to disconnect themselves from said belt by means of said inclined slideway, said loading means adapted to cause the actuation of said conveyer.

19. In an automatic weighing and filling machine, an endless conveyer belt, sprocket wheels for driving said belt, funnels carried by said belt and passing therethrough, said funnels adapted to carry cans placed thereon, means for sealing said cans to said belt, means for holding said cans on said belt, a slideway on which said funnels are moved, a fixed means for guiding said cans onto said slideway, a means for loading said cans, a means for sealing the connection between said cans and said loading means, a tapper for settling the load in said cans, said slideway having an inclined portion, whereby said cans are permitted to gradually slip from said funnels, a delivery means adapted to receive said loaded cans from said slideway, said loading means adapted to cause the actuation of said conveyer.

20. In an automatic weighing and filling machine, an endless conveyer belt, sprocket wheels for driving said belt, funnels carried by said belt and passing therethrough, said funnels adapted to carry cans placed thereon, means for sealing said cans to said belt, means for holding said cans on said belt, a slideway on which said funnels are moved, a means for guiding said cans onto said slideway, a means for loading said cans, a means for sealing the connection between said cans and said loading means, a means for settling the load in said cans, said slideway having an inclined portion and a delivery means adapted to receive said loaded cans from said slideway, said belt adapted to operate said delivery means, said loading means adapted to cause the actuation of said conveyer.

21. In an automatic weighing and filling machine, an endless conveyer belt, sprocket wheels for driving said belt, funnels carried by said belt and passing therethrough, said funnels adapted to carry cans placed thereon, means for sealing said cans to said belt, means for holding said cans on said belt, a slideway on which said funnels are moved, a means for guiding said cans onto said slideway, a means for loading said cans, a means for sealing the connection between said cans and said loading means, a means for settling the load in said cans, said slideway having an inclined portion and a delivery means adapted to receive said loaded cans from said slideway, said delivery means consisting of a rotary disk, said loading means adapted to cause the actuation of said conveyer.

22. In an automatic weighing and filling machine, an endless conveyer belt, sprocket wheels for driving said belt, funnels carried by said belt and passing therethrough, said funnels adapted to carry cans placed thereon, means for sealing said cans to said belt, means for holding said cans on said belt, a slideway on which said funnels are moved, a means for guiding said cans onto said slideway, a means for loading said cans, a means for sealing the connection between said cans and said loading means, a means for settling the load in said cans, said slideway having an inclined portion, a delivery means adapted to receive said loaded cans from said slideway, said delivery means consisting of a rotary disk, and a shaft carrying a sprocket wheel on said disk, said loading means adapted to cause the actuation of said conveyer.

23. In an automatic weighing and filling machine, an endless conveyer belt, sprocket wheels for driving said belt, funnels carried by said belt and passing therethrough, said funnels adapted to carry cans placed thereon, means for sealing said cans to said belt, means for holding said cans on said belt, a slideway on which said funnels are moved, a means for guiding said cans onto said slideway, a means for loading said cans, a means for sealing the connection between said funnels and said loading means, a means for settling the load in said cans, said slideway having an inclined portion, a delivery means adapted to receive said loaded cans from said slideway, said delivery means consisting of a rotary disk, and a shaft carrying a sprocket wheel on said disk, said funnels on said belt adapted to engage said sprocket wheel and rotate same, said loading means adapted to cause the actuation of said conveyer.

24. In an automatic weighing and filling machine, an endless conveyer belt, sprocket wheels for driving said belt funnels carried by said belt and passing therethrough, said funnels adapted to carry cans placed thereon, means for sealing said cans to said belt, means for holding said cans on said belt, a slideway on which said cans are moved, and means for guiding said cans onto said slideway, a means for loading said cans, a means for sealing the connection between said cans and said loading means, a means for settling the load in said cans, said slideway having an inclined portion, a delivery means adapted to receive said loaded cans from said slideway, said delivery means consisting of a rotary disk, a shaft carrying a sprocket wheel on said disk, said funnels on said belt adapted to engage said sprocket wheel and rotate same, and means for causing an intermittent movement of said belt.

25. In an automatic weighing and filling machine, a conveyer belt, means for driving said belt, carton supporting means on said belt, means for discharging a load into cartons carried by said belt, an oscillating hook for centering said cartons directly beneath said loading means, and means whereby said loading means will cause the actuation of said conveyer.

26. In an automatic weighing and filling machine, a conveyer belt, means for driving said belt, carton supporting means on said belt, means for discharging a load into cartons carried by said belt, a means for centering said cartons directly beneath said loading means, means for moving forward said belt should it stop before its point of center is reached, and means whereby said loading means will cause the actuation of said conveyer.

27. In combination with a machine having weighing hoppers, means for conveying cans to said hoppers, funnels connecting said cans and hoppers, means for sealing the connection between said funnels and hoppers, said means consisting of a movable member between said hoppers and funnels.

28. In an automatic, duplex weighing machine, scale beams, scale hoppers carried thereby, means for depositing an approximate short load into each of said hoppers, means for producing a continuous supply for augmenting said short load, an electrically operated slide for discontinuing said supply and means for cutting off said supply.

29. In an automatic, duplex weighing machine, scale beams, scale hoppers carried thereby, means for depositing an approximate short load into each of said hoppers, means for producing a continuous supply for augmenting said short load, an electrically operated slide, means for discontinuing said supply, means for cutting off said supply, and means for rigidly connecting said hoppers to said supply source.

30. In an automatic duplex weighing machine, scale beams, scale hoppers carried thereby and funnels, means for depositing an approximate short load into each of said hoppers, means for producing an additional supply for augmenting said short load, an electrically operated slide for cutting off said supply, means for rigidly connecting said hoppers to said supply source, and means whereby said hoppers may be dropped after their proper load have been received.

31. In an automatic duplex weighing machine, scale beams, scale hoppers carried thereby and funnels, means for depositing an approximate short load into each of said hoppers, means for producing an additional supply for augmenting said short load, an electrically operated slide for cutting off said supply, means for rigidly connecting said hoppers to said supply source, means whereby said hoppers may be dropped after their proper loads have been received, and means for rigidly connecting said hoppers with said funnels.

32. In an automatic duplex weighing machine, scale beams, scale hoppers carried thereby and funnels, means for depositing an approximate short load into each of said hoppers, means for producing an additional supply for augmenting said short load, an electrically operated slide for cutting off said supply, means for rigidly connecting said hoppers to said supply source, means whereby said hoppers may be dropped after their proper loads have been received, means for rigidly connecting said hoppers to said funnels, and means for discharging the loads from said hoppers to said delivery source.

33. In an automatic duplex weighing machine, scale beams, scale hoppers carried thereby and funnels, means for depositing an approximate short load into each of said hoppers, means for producing an additional supply for augmenting said short load, an electrically operated slide for cutting off said supply, means for rigidly connecting said hoppers to said supply source, means whereby said hoppers may be dropped after their proper loads have been received, means for rigidly connecting said hoppers to said funnels, means for discharging the loads from said hoppers to said delivery source, and means for operating said scale hoppers independently of one another.

34. In an automatic duplex weighing machine, scale beams, scale hoppers carried thereby and funnels, means for depositing an approximate short load into each of said hoppers, means for producing an additional supply for augmenting said short load, an electrically operated slide for cutting off said supply, means for rigidly connecting said hoppers to said supply source, means whereby said hoppers may be dropped after their proper loads have been received, means for rigidly connecting said hoppers to said funnels, means for discharging the load from said hoppers to said delivery source, means for operating said scale hoppers independently of one another, and means for sealing said hoppers to said supply source.

35. In an automatic duplex weighing machine, scale beams, scale hoppers carried thereby and funnels, means for depositing an approximate short load into each of said hoppers, means for producing an additional supply for augmenting said short load, an electrically operated slide for cutting off said supply, means for rigidly connecting said hoppers to said supply source, means whereby said hoppers may be dropped after their proper loads have been received, means for rigidly connecting said hoppers to said funnels, means for discharging the loads from said hoppers to said funnels, means for operating said scale hoppers independently of one another, means for sealing said hoppers to said supply source, and means for sealing said hoppers to said funnels.

36. In an automatic duplex weighing machine, scale beams, scale hoppers carried thereby and funnels, means for depositing an approximate short load into each of said hoppers, means for producing an additional supply for augmenting said short load, an electrically operated slide for cutting off said supply, means for rigidly connecting said hoppers to said supply source, means whereby said hoppers may be dropped after their proper loads have been received, means for rigidly connecting said hoppers to said funnels, means for discharging the loads from said hoppers to said funnels, means for operating said scale hoppers independently of one another, means for sealing said hoppers to said supply source, means for sealing said hoppers to said funnels, and means for guiding the outlets of said hoppers to said funnels.

37. In an automatic duplex weighing machine, scale beams, scale hoppers carried thereby and funnels, means for depositing an approximate short load into each of said hoppers, means for producing an additional supply for augmenting said short load, an electrically operated slide for cutting off said supply, means for rigidly connecting said hoppers to said supply source, means whereby said hoppers may be dropped after their proper loads have been received, means for rigidly connecting said hoppers to said funnels, means for discharging the loads from said hoppers to said delivery source, means for operating said scale hoppers independently of one another, means for sealing said hoppers to said supply source, means for sealing said hoppers to said funnels, means for guiding the outlets of said hoppers to said funnels, and means for sealing said funnels to cans being filled.

38. In a duplex automatic weighing machine, a supply chute, a supply chamber, an agitator therein, a shaft and gear for operating said agitator, measuring chambers connected to said supply chamber, measuring devices in said measuring chambers, shafts and gears for operating said measuring chambers, means for intermittently operating said measuring devices, scale hoppers adapted to receive loads from said measuring devices, independent delivery channels connecting said supply chamber to said scale hoppers, screw conveyers in said delivery channels, independent means for closing said channels, and shafts and gears for operating said screw conveyers.

39. In a duplex automatic weighing machine, a supply chute, a supply chamber, an agitator therein, a shaft and gear for operating said agitator, measuring chambers connected to said supply chamber, measuring devices in said measuring chambers, shafts and gears for operating said measuring chambers, means for intermittently operating said measuring devices, scale hoppers adapted to receive loads from said measuring devices, independent delivery channels connecting said supply chambers to said scale hoppers, screw conveyers in said delivery channels, independent means for closing said channels, shafts and gears for operating said screw conveyers, and means for automatically disconnecting said screw conveyer gears from a power source.

40. In a duplex automatic weighing machine, a supply chute, a supply chamber, an agitator therein, a shaft and gear for operating said agitator, measuring chambers connected to said supply chamber, measuring devices in said measuring chambers, shafts and gears for operating said measuring chambers, means for intermittently operating said measuring devices, scale hoppers adapted to receive loads from said measuring devices, independent delivery channels connecting said supply chamber to said screw hoppers, screw conveyers in said delivery channels, independent means for closing said channels, shafts and gears for operating said measuring chambers, means for automatically disconnecting said screw conveyer gears from a power source, and means for rigidly connecting said scale hoppers to said measuring chambers.

41. In a duplex automatic weighing machine, a supply chute, a supply chamber, an agitator therein, a shaft and gear for operating said agitator, measuring chambers connected to said supply chamber, measuring devices in said measuring chambers, shafts and gears for operating said measuring devices, means for intermittently operating said measuring devices, scale hoppers adapted to receive loads from said measuring devices, independent delivery channels connecting said supply chamber to said screw hoppers, screw conveyers in said delivery channels, independent means for closing said channels, shafts and gears for operating said measuring chambers, means for automatically disconnecting said screw conveyers from a power source, means for rigidly connecting said scale hoppers to said measuring chambers, and means for sealing said scale hoppers to said measuring chambers.

42. In a duplex automatic weighing machine, a supply chute, a supply chamber, an agitator therein, a shaft and gear for operating said agitator, measuring chambers connected to said supply chamber, measuring devices in said measuring chambers, shafts and gears for operating said measuring chambers, means for intermittently operating said measuring devices, scale hoppers adapted to receive loads from said measuring devices, independent delivery channels connecting said supply chamber to said screw hoppers, screw conveyers in said delivery channels, independent means for closing said channels, shafts and gears for operating said measuring chambers, means for automatically disconnecting said screw conveyers from a power source, and means for rigidly connecting said scale hoppers to said measuring chambers, means for sealing said scale hoppers to said measuring chambers, and scale beams carrying said hoppers, a triangular member having a knife edge upon which said beams operate.

43. In a duplex automatic weighing machine, a supply chute, a supply chamber, an agitator therein, a shaft and gear for operating said agitator, measuring chambers connected to said supply chamber, measuring devices in said measuring chambers, shafts and gears for operating said measuring chambers, means for intermittently operating said measuring devices, scale hoppers adapted to receive loads from said measuring devices, independent delivery channels connecting said supply chamber to said screw hoppers, screw conveyers in said delivery channels, independent means for closing said channels, shafts and gears for operating said measuring chambers, means for automatically disconnecting said screw conveyers from a power source, means for rigidly connecting said scale hoppers to said measuring chambers, means for sealing said scale hoppers to said measuring chambers, scale beams carrying said hoppers, a triangular member having a knife edge, said fulcrum being balanced on its sharpest edge upon which said beams operate which terminates in projecting points and supports therefor.

44. In a duplex automatic weighing machine, a supply chute, a supply chamber, an agitator therein, a shaft and gear for operating said agitator, measuring chambers connected to said supply chamber, measuring devices in said measuring chambers, shafts and gears for operating said measuring chambers, means for intermittently operating said measuring devices, scale hoppers adapted to receive loads from said measuring devices, independent delivery channels connecting said supply chamber to said screw hoppers, screw conveyers in said delivery channels, independent means for closing said channels, shafts and gears for operating said measuring chambers, means for automatically disconnecting said screw conveyers from a power source, means for rigidly connecting said scale hoppers to said measuring chambers, means for sealing said scale hoppers to said measuring chambers, and scale beams carrying said hoppers, said beams operating on a triangular member having a knife edge, a clamp to engage said beam simultaneously.

45. In a duplex automatic weighing machine, a supply chute, a supply chamber, an agitator therein, a shaft and gear for operating said agitator, measuring chambers connected to said supply chamber, measuring devices in said measuring chambers, shafts and gears for operating said measuring chambers, means for intermittently operating said measuring devices, scale hoppers adapted to receive loads from said measuring devices, independent delivery channels connecting said supply chamber to said scale hoppers, screw conveyers in said delivery channels, independent means for closing said channels, shafts and gears for operating said measuring chambers, means for automatically disconnecting said screw conveyers from a power source, means for rigidly connecting said scale hoppers to said measuring chambers, scale beams carrying said hoppers, a triangular member having a knife edge upon which said beams operate, a clamp adapted to engage said beams simultaneously, and a cam for operating said clamp intermittently.

46. In a duplex automatic weighing machine, a supply chute, a supply chamber, an agitator therein, a shaft and gear for operating said agitator, measuring chambers connected to said supply chamber, measuring devices in said measuring chambers, shafts and gears for operating said measuring chambers, means for intermittently operating said measuring devices, scale hoppers adapted to receive loads from said measuring devices, independent delivery channels connecting said supply chamber to said scale hoppers, screw conveyers in said delivery channels, independent means for closing said channels, shafts and gears for operating said measuring chambers, means for automatically disconnecting said screw conveyers from a power source, means for rigidly connecting said scale hoppers to said measuring chambers, means for sealing said scale hoppers to said measuring chambers, scale beams carrying said hoppers, a triangular member having a knife edge upon which said beams operate, rollers on the free ends of said beams and cams for engaging said rollers.

47. In a duplex automatic weighing machine, a supply chute, a supply chamber, an agitator therein, a shaft and gear for operating said agitator, measuring chambers connected to said supply chamber, measuring devices in said measuring chambers, shafts and gears for operating said measuring chambers, means for intermittently operating said measuring devices, scale hoppers adapted to receive loads from said measuring devices, independent delivery channels connecting said supply chamber to said scale hoppers, screw conveyers in said delivery channels, independent means for closing said channels, shafts and gears for operating said measuring chambers, means for automatically disconnecting said screw conveyers from a power source, means for rigidly connecting said scale hoppers to said measuring chambers, means for sealing said scale hoppers to said measuring chambers, scale beams carrying said hoppers, a triangular member having a knife edge upon which said beams operate, rollers on the free ends of said beams and cams for engaging said rollers, said cams being fixedly secured to clutches loosely mounted on a continuously rotating shaft, a second shaft driving said first shaft and making one revolution to three of said second shaft.

48. In a duplex automatic weighing machine, a supply chute, a supply chamber, an agitator therein, a shaft and gear for operating said agitator, measuring chambers connected to said supply chamber, measuring devices in said measuring chambers, means for intermittently operating said measuring devices, scale hoppers adapted to receive loads from said measuring devices, independent delivery channels connecting said supply chamber to said scale hoppers, screw conveyers in said delivery channels, independent means for closing said channels, shafts and gears for operating said measuring chambers, means for automatically disconnecting said screw conveyers from a power source, means for rigidly connecting said scale hoppers to said measuring chambers, means for sealing said scale hoppers to said measuring chambers, scale beams carrying said hoppers, a triangular member having a knife edge upon which said beams operate, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shaft and spring operated clutch pins for securing said clutches to said power wheels.

49. In a duplex automatic weighing machine, a supply chute, a supply chamber, an agitator therein, a shaft and gear for operating said agitator, measuring chambers connected to said supply chamber, measuring devices in said measuring chambers, means for intermittently operating said measuring devices, scale hoppers adapted to receive loads from said measuring devices, independent delivery channels connecting said supply chamber to said scale hoppers, screw conveyers in said delivery channels, independent means for closing said channels, shafts and gears for operating said measuring chambers, means for automatically disconnecting said screw conveyers from a power source, means for rigidly connecting said scale hoppers to said measuring chambers, means for sealing said scale hoppers to said measuring chambers, scale beams carrying said hoppers, a triangular member having a knife edge upon which said beams operate, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shaft, spring operated clutch pins for securing said clutches to said power wheels, and levers adapted to operate said pins.

50. In a duplex automatic weighing machine, a supply chute, a supply chamber, an agitator therein, a shaft and gear for operating said agitator, measuring chambers connected to said supply chamber, measuring devices in said measuring chambers, means for intermittently operating said measuring devices, scale hoppers adapted to receive loads from said measuring devices, independent delivery channels connecting said supply chamber to said scale hoppers, screw conveyers in said delivery channel, independent means for closing said channel, shafts and gears for operating said measuring chambers, means for automatically disconnecting said screw conveyers from a power source, means for rigidly connecting said scale hoppers to said measuring chambers, means for sealing said scale hoppers to said measuring chambers, scale beams carrying said hoppers, a triangular member having a knife edge upon which said beams operate, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shaft, spring operated clutch pins for securing said clutches to said power wheels and levers adapted to operate said pins, means for normally holding said levers in engagement with said pins.

51. In a duplex automatic weighing machine, a supply chute, a supply chamber, an agitator therein, a shaft and gear for operating said agitator, measuring chambers connected to said supply chamber, measuring devices in said measuring chambers, means for intermittently operating said measuring devices, scale hoppers adapted to receive loads from said measuring devices, independent delivery channels connecting said supply chambers to said scale hoppers, screw conveyers in said delivery channel, independent means for closing said channel, shaft and gears for operating said measuring chambers, means for automatically disconnecting said screw conveyers from a power source, means for rigidly connecting said scale hoppers to said measuring chambers, means for sealing said scale hoppers to said measuring chambers, scale beams carrying said hoppers a triangular member having a knife edge upon which said beams operate, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shaft, spring operated clutch pins for securing said clutches to said power wheels, levers adapted to operate said pins, means for normally holding said levers in engagement with said pins, and means for automatically releasing said levers from said pins.

52. In a duplex weighing machine, a supply chute, a supply chamber, an agitator therein, a shaft and gear for operating said agitator, measuring chambers connected to said supply chamber, measuring devices in said measuring chambers, means for intermittently operating said measuring devices, scale hoppers adapted to receive loads from said measuring devices, independent delivery channels connecting said supply chamber to said hopper, screw conveyers in said delivery channel, independent means for closing said channels, shaft and gears for operating said measuring chambers, means for automatically disconnecting said screw conveyers from a power source, means for rigidly connecting said scale hoppers to said measuring chambers, means for sealing said scale hoppers to said measuring chambers, scale beams carrying said hoppers, a triangular member having a knife edge upon which said beams operate, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shaft, spring operated clutch pins for securing said clutches to said power wheels, levers adapted to operate said pins, means for normally holding said levers in engagement with said pins, means for automatically releasing said levers from said pins, posts on said levers and bolts for normally holding said posts down locking said levers into engagement with said pins.

53. In a duplex weighing machine, a supply chute, a supply chamber, an agitator therein, a shaft and gear for operating said agitator, measuring chambers connected to said supply chamber, measuring devices in said measuring chambers, means for intermittently operating said measuring devices, scale hoppers adapted to receive loads from said measuring devices, independent delivery channels connecting said supply chamber to said hoppers, screw conveyers in said delivery channels, independent means for closing said channels, shafts and gears for operating said measuring chambers, means for automatically disconnecting said screw conveyers from a power source, means for rigidly connecting said scale hoppers to said measuring chambers, means for sealing said scale hoppers to said measuring chambers, scale beams carrying said hoppers, a triangular member having a knife edge upon which said beams operate, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shaft, spring operated clutch pins for securing said clutches, to said power wheels, levers adapted to operate said pins, means for normally holding said levers in engagement with said pins, means for automatically releasing said levers from said pins, posts on said levers and bolts for normally holding said posts down locking said levers into engagement with said pins and means for automatically releasing said bolts.

54. In a duplex weighing machine, a supply chute, a supply chamber, an agitator therein, a shaft and gear for operating said agitator, measuring chambers connected to said supply chamber, measuring devices in said measuring chambers, means for intermittently operating said measuring devices, scale hoppers adapted to receive loads from said measuring devices, independent delivery channels connecting said supply chamber to said hoppers, screw conveyers in said delivery channels, independent means for closing said channels, shafts and gears for operating said measuring chambers, means for automatically disconnecting said screw conveyers from a power source, means for rigidly connecting said scale hoppers to said measuring chambers, means for sealing said scale hoppers to said measuring chambers, scale beams carrying said hoppers, a triangular member having a knife edge upon which said beams operate, rollers on the free ends of said beams and cams for engaging said rollers, said cams being fixedly secured to clutches, loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shaft, spring operated clutch pins for securing said clutches to said power wheels, levers adapted to operate said pins, means for normally holding said levers in engagement with said pins, means for automatically releasing said levers from said pins, posts on said levers and bolts for normally holding said posts down and locking said levers into engagement with said pins, means for automatically releasing said bolts and electrically operated means for releasing said bolts.

55. In a duplex automatic weighing machine, a supply chute, a supply chamber, an agitator therein, a shaft and gear for operating said agitator, measuring chambers connected to said supply chamber, measuring devices in said measuring chambers, means for intermittently operating said measuring devices, scale hoppers adapted to receive loads from said measuring devices, independent delivery channels connecting said supply chamber to said scale hoppers, screw conveyers in said delivery channels, independent means for closing said channels, shafts and gears for operating said measuring chambers, means for automatically disconnecting said screw conveyers from a power source, means for rigidly connecting said scale hoppers to said measuring chambers, means for sealing said screw hoppers to said measuring chambers, scale beams carrying said hoppers, a triangular member having a knife edge upon which said beams operate, rollers on the free ends of said beams and cams for engaging said rollers, said cams being fixedly secured to clutches, loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shaft, spring operated clutch pins for securing said clutches to said power wheels and levers adapted to operate said pins, means for holding said levers in engagement with said pins, posts on said levers and bolts for normally holding said posts down and locking said levers into engagement with said pins, an armature connected with said bolts, a magnet for attracting said armature and releasing said bolts.

56. In a duplex automatic weighing machine, a supply chute, a supply chamber, an agitator therein, a shaft and gear for operating said agitator, measuring chambers connected to said supply chamber, measuring devices in said measuring chambers, means for intermittently operating said measuring devices, scale hoppers adapted to receive loads from said measuring devices, independent delivery channels connecting said supply chamber with said scale hoppers, screw conveyers in said delivery channel, independent means for closing said channel, shafts and gears for operating said measuring chambers, means for automatically disconnecting said screw conveyers from a power source, means for rigidly connecting said scale hoppers to said measuring chambers, means for sealing said scale hoppers to said measuring chambers, scale beams carrying said hoppers, a triangular member having a knife edge upon which said beams operate, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shafts, spring operated clutch pins for securing said clutches to said power wheels and levers adapted to operate said pins, means for normally holding said levers in engagement with said pins, posts on said levers and bolts for normally holding said posts down and locking said levers into engagement with said pins, an armature connected with said bolts, a magnet for attracting said armature and releasing said bolts, and a circuit maker for said magnet.

57. In a duplex automatic weighing machine, a supply chute, a supply chamber, an agitator therein, a shaft and gear for operating said agitator, measuring chambers connected to said supply chamber, measuring devices in said measuring chambers, means for intermittently operating said measuring devices, scale hoppers adapted to receive loads from said measuring devices, independent delivery channels connecting said supply chamber with said scale hopper, screw conveyers in said delivery channel, independent means for closing said channel, shafts and gears for operating said measuring chambers, means for automatically disconnecting said screw conveyers from a power source, means for rigidly connecting said scale hoppers to said measuring chambers, means for sealing said scale hoppers to said measuring chambers, scale beams carrying said hoppers, a triangular member having a knife edge upon which said beams operate, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shafts, spring operated clutch pins for securing said clutches to said power wheels and levers adapted to operate said pins, means for normally holding said levers in engagement with said pins, posts on said levers and bolts for normally holding said posts down and locking said levers into engagement with said pins, an armature connected with said bolts, a magnet for attracting said armature and releasing said bolts, a circuit maker for said magnet, and means on scale beams for operating said circuit maker.

58. In a duplex automatic weighing machine, a supply chute, a supply chamber, an agitator therein, a shaft and gear for operating said agitator, measuring chambers connected to said supply chamber, measuring devices in said measuring chambers, means for intermittently operating said measuring devices, scale hoppers adapted to receive loads from said measuring devices, independent delivery channels connecting said supply chamber with said scale hopper, screw conveyers in said delivery channel, independent means for closing said channel, shafts and gears for operating said measuring chambers, means for automatically disconnecting said screw conveyers from a power source, means for rigidly connecting said scale hoppers to said measuring chambers, means for sealing said scale hoppers to said measuring chambers, scale beams carrying said hoppers, a triangular member having a knife edge upon which said beams operate, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shafts, spring operated clutch pins for securing said clutches to said power wheels and levers adapted to operate said pins, means for normally holding said levers in engagement with said pins, posts on said levers and bolts for normally holding said posts down and locking said levers into engagement with said pins, an armature connected with said bolts, a magnet for attracting said armature and releasing said bolts, a circuit maker for said magnet, and means on scale beams for operating said circuit maker, a trip on said circuit maker.

59. In a duplex automatic weighing machine, a supply chute, a supply chamber, an agitator therein, a shaft and gear for operating said agitator, measuring chambers connected to said supply chamber, measuring devices in said measuring chambers, means for intermittently operating said measuring devices, scale hoppers adapted to receive loads from said measuring devices, independent delivery channels connecting said supply chamber with said scale hopper, screw conveyers in said delivery channel, independent means for closing said channel, shafts and gears for operating said measuring chambers, means for automatically disconnecting said screw conveyers from a power source, means for rigidly connecting said scale hoppers to said measuring chambers, means for sealing said scale hoppers to said measuring chambers, scale beams carrying said hoppers, a triangular member having a knife edge upon which said beams operate, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shafts, spring operated clutch pins for securing said clutches to said power wheels and levers adapted to operate said pins, means for normally holding said levers in engagement with said pins, posts on said levers and bolts for normally holding said posts down and locking said levers into engagement with said pins, an armature connected with said bolts, a magnet for attracting said armature and releasing said bolts, a circuit maker for said magnet, and means on scale beams for operating said circuit maker, a trip on said circuit maker, a bell crank mounted on said machine and means connected with said crank for operating a lever, means connected to said lever for simultaneously connecting said bevel gears operating said screw conveyers, with said power source.

60. In a duplex automatic weighing machine, a supply chute, a supply chamber, an agitator therein, a shaft and gear for operating said agitator, measuring chambers connected to said supply chamber, measuring devices in said measuring chambers, means for intermittently operating said measuring devices, scale hoppers adapted to receive loads from said measuring devices, independent delivery channels connecting said supply chamber with said scale hopper, screw conveyers in said delivery channel, independent means for closing said channel, shafts and gears for operating said measuring chambers, means for automatically disconnecting said screw conveyers from a power source, means for rigidly connecting said scale hoppers to said measuring chambers, means for sealing said scale hoppers to said measuring chambers, scale beams carrying said hoppers, a triangular member having a knife edge upon which said beams operate, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shafts, spring operated clutch pins for securing said clutches to said power wheels and levers adapted to operate said pins for normally holding said levers in engagement with said pins, posts on said levers and bolts for normally holding said posts down and locking said levers into engagement with said pins, an armature connected with said bolts, a magnet for attracting said armature and releasing said bolts, a circuit maker for said magnet, and means on said scale beams for operating said circuit maker, a trip on said circuit maker, a bell crank mounted on said machine and means connected with said crank for operating a lever, means connected to said lever for simultaneously connecting said bevel gears operating said screw conveyers with said power source, said bevel-gear connecting means consisting of separately operable spring controlled forks.

61. In a duplex automatic weighing machine, a supply chute, a supply chamber, an agitator therein, a shaft and gear for operating said agitator, measuring chambers connected to said supply chamber, measuring devices in said measuring chambers, means for intermittently operating said measuring devices, scale hoppers adapted to receive loads from said measuring devices, independent delivery channels connecting said supply chamber with said scale hopper, screw conveyers in said delivery channel, independent means for closing said channel, shafts and gears for operating said measuring chambers, means for automatically disconnecting said screw conveyers from a power source, means for rigidly connecting said scale hoppers to said measuring chambers, means for sealing said scale hoppers to said measuring chambers, scale beams carrying said hoppers, a triangular member having a knife edge upon which said beams operate, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shafts, spring operated clutch pins for securing said clutches to said power wheels and levers adapted to operate said pins for normally holding said levers in engagement with said pins, posts on said levers and bolts for normally holding said posts down and locking said levers into engagement with said pins, an armature connected with said bolts, a magnet for attracting said armature and releasing said bolts, a circuit maker for said magnet, a means on said scale beams for operating said circuit maker, a trip on said circuit maker, a bell crank mounted on said machine and means connected with said crank for operating a lever, means connected to said lever for simultaneously connecting said bevel gears operating said screw conveyers with said power source, said bevel gear connecting means consisting of separately operable spring controlled forks, a transmitting gear for operating the gears for said controlling measuring blocks.

62. In a duplex automatic weighing machine, a supply chute, a supply chamber, an agitator therein, a shaft and gear for operating said agitator, measuring chambers connected to said supply chamber, measuring devices in said measuring chambers, means for intermittently operating said measuring devices, independent delivery channels connecting said supply chamber with said scale hopper, screw conveyers in said delivery channel, independent means for closing said channel, shafts and gears for operating said measuring chambers, means for automatically disconnecting said screw conveyers from a power source, means for rigidly connecting said scale hoppers to said measuring chambers, scale beams carrying said hoppers, said beams operating on a triangular member having a knife edge, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shafts, spring operated clutch pins for securing said clutches to said power wheels, and levers adapted to operate said pins for normally holding said levers in engagement with said pins, posts on said levers and bolts for normally holding said posts down and locking said levers into engagement with said pins, an armature connected with said bolts, a magnet for attracting said armature and releasing said bolts, a circuit maker for said magnet, a means on said scale beams for operating said circuit maker, a trip on said circuit maker, a bell crank mounted on said machine, means connected with said crank for operating a lever, means connected to said lever for simultaneously connecting said bevel gears operating said screw conveyers with said power source, said bevel gear connecting means consisting of separably operable spring controlled forks, a transmitting gear for operating the gears for controlling said measuring blocks, means on said transmitting gear for shifting said fork operating means.

63. In a duplex automatic weighing machine, a supply chute, a supply chamber, an agitator therein, a shaft and gear for operating said agitator, measuring chambers connected to said supply chamber, measuring devices in said measuring chambers, means for intermittently operating said measuring devices, scale hoppers adapted to receive loads from said measuring devices, independent delivery channels connecting said supply chamber with said scale hoppers, screw conveyers in said delivery channel, independent means for closing said channel, shafts and gears for operating said measuring chambers, means for automatically disconnecting said screw conveyers from a power source, means for rigidly connecting said scale hoppers to said measuring chambers, means for sealing said scale hoppers to said measuring chambers, scale beams carrying said hoppers, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shaft, spring operated clutch pins for securing said clutches to said power wheels and levers adapted to operate said pins, means for normally holding said levers in engagement with said pins, posts on said levers and bolts for normally holding said posts down and locking said levers into engagement with said pins, an armature connected with said bolts, a magnet for attracting said armature and releasing said bolts, a circuit maker for said magnet, means on said scale beams for operating said circuit maker, a trip on said circuit maker, a bell crank mounted on said machine, means connected with said crank for operating a lever, means connected to said lever for simultaneously connecting said bevel gear operating said screw conveyers with said power source, a hook on said bell crank for locking same into and in operative position, said trip adapted to trip said hook.

64. In a duplex automatic weighing machine, a supply chute, a supply chamber, an agitator therein, a shaft and gear for operating said agitator, measuring chambers connected to said supply chamber, measuring devices in said measuring chambers, means for intermittently operating said measuring devices, scale hoppers adapted to receive loads from said measuring devices, independent delivery channels connecting said supply chamber with said scale hoppers, screw conveyers in said delivery channel, independent means for closing said channels, shafts and gears for operating said measuring chambers, means for automatically disconnecting said screw conveyers from a power source, means for rigidly connecting said scale hoppers to said measuring chambers, means for sealing said scale hoppers to said measuring chambers, scale beams carrying said hoppers, a triangular member having a knife edge upon which said beams operate, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shaft, spring operated clutch pins for securing said clutches to said power wheels and levers adapted to operate said pins, means for normally holding said levers in engagement with said pins, posts on said levers and bolts for normally holding said posts down and locking said levers into engagement with said pins, an armature connected with said bolts, a circuit maker for said magnet, means on said scale beams for operating said circuit maker, a trip on said circuit maker, a bell crank mounted on said machine, means connected with said crank for operating a lever, means connected to said lever for simultaneously connecting said bevel gear operating said screw conveyers with said power source, a hook on said bell crank for locking same into an inoperative position, said trip adapted to trip said hook, the shifting of said fork operating means adapted to disconnect said circuit maker and cause said bell crank hook to again lock said bell crank.

65. In a duplex automatic weighing machine, a supply chute, a supply chamber, an agitator therein, a shaft and gear for operating said agitator, measuring chambers connected to said supply chamber, measuring devices in said measuring chambers, means for intermittently operating said measuring devices, scale hoppers adapted to receive loads from said measuring devices, independent delivery channels connecting said supply chamber with said scale hoppers, screw conveyers in said delivery channels, independent means for closing said channels, shafts and gears for operating said measuring chambers, means for automatically disconnecting said screw conveyers from a power source, means for rigidly connecting said scale hoppers to said measuring chambers, means for sealing said scale hoppers to said measuring chambers, scale beams carrying said hoppers, a triangular member having a knife edge upon which said beams operate, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shaft, spring operated clutch pins for securing said clutches to said power wheels and levers adapted to operate said pins, means for normally holding said levers in engagement with said pins, posts on said levers and bolts for normally holding said posts down and locking said levers into engagement with said pins, an armature connected with said bolts, a magnet for attracting said armature and releasing said bolts, a circuit maker for said magnet, means on said scale beams for operating said circuit maker, a trip on said circuit maker, a bell crank mounted on said machine, means connected with said crank for operating a lever, means connected to said lever for simultaneously connecting said bevel gears operating said screw conveyers with said power source, a hook on said bell crank for locking same into an inoperative position, said trip adapted to trip said hook, the shifting of said fork operating means adapted to disconnect said circuit maker and cause said bell crank hook to again lock said bell crank, cams for forcing said spring operating levers into engagement with said pins and disconnecting said pins from said power wheels, and means for stopping the rotation of said clutches.

66. In a duplex automatic weighing machine, a supply chute, a supply chamber, an agitator therein, a shaft and gear for operating said agitator, measuring chambers connected with said supply chamber, measuring devices in said measuring chambers, means for intermittently operating said measuring devices, scale hoppers adapted to receive loads from said measuring devices, independent delivery channels connecting said supply chambers with said scale hoppers, screw conveyers in said delivery channels, independent means for closing said channels, shafts and gears for operating said measuring chambers, means for automatically disconnecting said screw conveyers from a power source, means for rigidly connecting said scale hoppers to said measuring chambers, means for sealing said scale hoppers to said measuring chambers, scale beams carrying said hoppers, a triangular member having a knife edge upon which said beams operate, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shafts, spring operated clutch pins for securing said clutches to said power wheels and levers adapted to operate said pins, means for normally holding said levers in engagement with said pins, posts on said levers and bolts for normally holding said posts down and locking said levers into engagement with said pins, an armature connected with said bolts, a magnet for attracting said armature and releasing said bolts, a circuit maker for said magnet, means on said scale beams for operating said circuit maker, a trip on said circuit maker, a bell crank mounted on said machine, means connected with said crank for operating a lever, means connected with said lever for simultaneously connecting said bevel gear operating said screw conveyers with said power source, a hook on said bell crank for locking same into an inoperative position, said trip adapted to trip said hook, the shifting of said fork operating means adapted to disconnect said circuit maker and cause said bell crank hook to again lock said bell crank, cams for forcing said spring operating levers into engagement with said pins and disconnecting said pins from said power wheels, means for stopping the rotation of said clutches and a main power shaft from which said first shaft is driven, a bevel gear on one end of said power shaft, a main operating shaft, a loose collar on one end thereof, a bevel gear on said collar, said gear nesting with said gear on said power shaft and revolving continuously, a driving wheel fixed to said collar, a clutch on said main operating shaft, a pin adapted to connect said clutch to said driving wheel on said collar, a lever for operating said pin, a spring for holding said lever normally engaging said pin.

67. In a duplex automatic weighing machine, a supply chute, a supply chamber, an agitator therein, a shaft and gear for operating said agitator, measuring chambers connected with said supply chamber, measuring devices in said measuring chambers, means for intermittently operating said measuring devices, scale hoppers adapted to receive loads from said measuring devices, independent delivery channels connecting said supply chambers with said scale hoppers, screw conveyers in said delivery channels, independent means for closing said channels, shafts and gears for operating said measuring chambers, means for automatically disconnecting said screw conveyers from a power source, means for rigidly connecting said scale hoppers to said measuring chambers, means for sealing said scale hoppers to said measuring chambers, scale beams carrying said hoppers, a triangular member having a knife edge upon which said beams operate, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shaft, spring operated clutch pins for securing said clutches to said power wheels and levers adapted to operate said pins, means for normally holding said levers in engagement with said pins, posts on said levers and bolts for normally holding said posts down and locking said levers into engagement with said pins, an armature connected with said bolts, a magnet for attracting said armature and releasing said bolts, a circuit maker for said magnet, means on said scale beams for operating said circuit maker, a trip on said circuit maker, a bell crank mounted on said machine, means connected with said crank for operating a lever, means connected with said lever for simultaneously connecting said bevel gear operating said screw conveyers with said power source, a hook on said bell crank for locking same into an inoperative position, said trip adapted to trip said hook, the shifting of said hook operating means adapted to disconnect said circuit maker and cause said bell crank hook to again lock said bell crank, cams for forcing said spring operating levers into engagement with said pins and disconnecting said pins from said power wheels, means for stopping the rotation of said clutches and a main power shaft from which said first shaft is driven, a bevel gear on one end of said power shaft, a main operating shaft, a loose collar on one end thereof, a bevel gear on said collar, said gear nesting with said gear on said power shaft and revolving continuously, a driving wheel fixed to said collar, a clutch on said main operating shaft, a pin adapted to connect said clutch to said driving wheel on said collar, a lever for operating said pins, a spring for holding said lever normally engaging said pins, cams on said primary clutch, a pair of rods adapted to be operated by said cams, a cross arm connected to said rods, a lever operating rod pivoted to said cross arm, and a lever connected therewith and adapted to throw said spring controlled pin operating lever.

68. In a duplex automatic weighing machine, a supply chute, a supply chamber, an agitator therein, a shaft and gear for operating said agitator, measuring chambers connected with said supply chamber, measuring devices in said measuring chambers, means for intermittently operating said measuring devices, scale hoppers adapted to receive loads from said measuring devices, independent delivery channels connecting said supply chamber with said scale hoppers, screw conveyers in said delivery channels, independent means for closing said channels, shafts and gears for operating said measuring chambers, means for automatically disconnecting said screw conveyers from a power source, means for rigidly connecting said scale hoppers with said measuring chambers, means for sealing said scale hoppers to said measuring chambers, scale beams carrying said hoppers, a triangular member having a knife edge upon which said beams operate, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shaft, spring operated clutch pins for securing said clutches to said power wheels and levers adapted to operate said pins, means for normally holding said levers in engagement with said pins, posts on said levers and bolts for normally holding said posts down and locking said levers into engagement with said pins, an armature connected with said bolts, a magnet for attracting said armature and releasing said bolts, a circuit maker for said magnet, means on said scale beams for operating said circuit maker, a trip on said circuit maker, a bell crank mounted on said machine, means connected with said crank for operating a lever, means connected with said lever for simultaneously connecting said bevel gear operating said screw conveyers with said power source, a hook on said bell crank for locking same into an inoperative position, said trip adapted to trip said hook, the shifting of said hook operating means adapted to disconnect said circuit maker and cause said bell crank hook to again lock said bell crank, cams for forcing said spring operating levers into engagement with said pins and disconnecting said pins from said power wheels, means for stopping the rotation of said clutches and a main power shaft from which said first shaft is driven, a bevel gear on one end of said power shaft, a main operating shaft, a loose collar on one end thereof, a bevel gear on said collar, said gear nesting with said gear on said power shaft and revolving continuously, a driving wheel fixed to said collar, a clutch on said main operating shaft, a pin adapted to connect said clutch to said driving wheel on said collar, a lever for operating said pin, a spring for holding said lever normally engaging said pin, cams on said primary clutch, a pair of rods adapted to be operated by said cams, a cross arm connected to said rod, a lever operating rod pivoted to said cross arm, a lever connected therewith and adapted to throw said spring controlled pin operated lever, hooks on each of said pair of rods for holding them in a lowered position, said lever operating rod being operable only when both of said pair of rods has been lowered.

69. In a duplex automatic weighing machine, a supply chute, a supply chamber, an agitator therein, a shaft and gear for operating said agitator, measuring chambers connected with said supply chamber, measuring devices in said measuring chamber, means for intermittently operating said measuring devices, scale hoppers adapted to receive loads from said measuring devices, independent delivery channels connecting said supply chamber with said scale hoppers, screw conveyers in said delivery channels, independent means for closing said channel, shafts and gears for operating said measuring chambers, means for automatically disconnecting said screw conveyers from a power source, means for rigidly connecting said scale hoppers with said measuring chambers, means for sealing said scale hoppers to said measuring chambers, scale beams carrying said hoppers, a triangular member having a knife edge upon which said beams operate, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shaft, spring operated clutch pins for securing said clutches to said power wheels and levers adapted to operate said pins, means for normally holding said levers in engagement with said pins, posts on said levers and bolts for normally holding said posts down and locking said levers into engagement with said pins, an armature connected with said bolts, a magnet for attracting said armature and releasing said bolt, a circuit maker for said magnet, means on said scale beams for operating said circuit maker, a trip on said circuit maker, a bell crank mounted on said machine, means connected with said crank for operating a lever, means connected with said lever for simultaneously connecting said bevel gear operating said screw conveyers with said power source, a hook on said bell crank for locking same into an inoperative position, said trip adapted to trip said hook, the shifting of said hook operating means adapted to disconnect said circuit maker and cause said bell crank hook to again lock said bell crank, cams for forcing said spring operated levers into engagement with said pins and disconnecting said pins from said power wheels, means for stopping the rotation of said clutches and a main power shaft from which said first shaft is driven, a bevel gear on one end of said power shaft, a main operating shaft, a loose collar on one end thereof, a bevel gear on one end of said collar, said gear nesting with said gear on said power shaft and revolving continuously, a driving wheel fixed to said collar, a clutch on said main operating shaft, a pin adapted to connect said clutch to said driving wheel on said collar, a lever for operating said pin, a spring for holding said lever normally engaging said pins, cams on said primary clutch, a pair of rods adapted to be operated by said cams, a cross arm connected with said rods, a lever operating rod pivoted to said cross arm, a lever connected therewith and adapted to throw said spring controlled pin operated lever, hooks on each of said pair of rods for holding them in a lowered position, said lever operated rods being operable only when both of said pair of rods have been lowered and means for simultaneously releasing said pair of rods.

70. In a duplex automatic weighing machine, a supply chute, a supply chamber, an agitator therein, a shaft and gear for operating said agitator, measuring chambers, connected with said supply chamber, measuring devices in said measuring chambers, means for intermittently operating said measuring devices, scale hoppers adapted to receive loads from said measuring devices, independent delivery channels connecting said supply chamber with said scale hoppers, screw conveyers in said delivery channels, independent means for closing said channels, shafts and gears for operating said measuring chambers, means for automatically disconnecting said screw conveyers from a power source, means for rigidly connecting said scale hoppers with said measuring chambers, means for sealing said scale hoppers to said measuring chambers, scale beams carrying said hoppers, a triangular member having a knife edge upon which said beams operate, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shaft, pin operated clutch pins for securing said clutches to said power wheels and levers adapted to operate said pins, posts on said levers and bolts for normally holding said posts down and locking said levers into engagement with said pins, an armature connected with said bolts, a magnet for attracting said armature and releasing said bolts, a circuit maker for said magnet, means on said scale beams for operating said circuit maker, a trip on said circuit maker, a bell crank mounted on said machine, means connected with said crank for operating a lever, means connected with said lever for simultaneously connecting said bevel gear operating said screw conveyers with said power source, a hook on said bell crank for locking same into an inoperative position, said trip adapted to trip said hook, the shifting of said hook operating means adapted to disconnect said circuit maker and cause said bell crank hook to again lock said bell crank, cams for forcing said spring operated levers into engagement with said pins and disconnecting said pins from said power wheels, means for stopping the rotation of said clutches, a main power shaft from which said first shaft is driven, a bevel gear on one end of said power shaft, a main operating shaft, a loose collar on one end thereof, a bevel gear on one end of said collar, said gear nesting with said gear on said power shaft and revolving continuously, a driving wheel fixed to said collar, a clutch on said main operating shaft, a pin adapted to connect said clutch to said driving wheel on said collar, a lever for operating said pin, a spring for holding said lever normally engaging said pin, cams on said primary clutch, a pair of rods adapted to be operated by said cams, a cross arm connected to said rods, a lever operated rod pivoted to said cross arm, a lever connected therewith and adapted to throw said spring controlled pin operated lever, hooks on each side of said pair of rods for holding them in a lowered position, said lever operated rods being operable only when both of said pair of rods have been lowered and means for simultaneously releasing said pair of rods, a mutilated gear on said main operating shaft, said main operating shaft adapted to make one-third revolution intermittently, a gear on said main operating shaft adapted to mesh with a gear on said endless belt conveyer sprocket wheel.

71. In a duplex automatic weighing machine, a supply chute, a supply chamber, an agitator therein, a shaft and gear for operating said agitator, measuring chambers connected with said supply chamber, measuring devices in said measuring chambers, means for intermittently operating said measuring devices, scale hoppers adapted to receive loads from said measuring devices independent delivery channels connecting said supply chamber with said scale hoppers, screw conveyers in said delivery channels, independent means for closing said channels, shafts and gears for operating said measuring chambers, means for automatically disconnecting said screw conveyers from a power source, means for rigidly connecting said scale hoppers with said measuring chambers, means for sealing said scale hoppers to said measuring chambers, scale beams carrying said hoppers, a triangular member having a knife edge upon which said beams operate, rollers on the free ends of said beams and cams for engaging said rollers, said cams being fixedly secured to clutches loosely mounted on a continuously rotating shaft, a second shaft driving said first shaft and making one revolution to three revolutions of said second shaft, said cams being fixedly secured to clutches, a continuously revolving shaft, said clutches loosely mounted on said shaft, power wheels fixedly secured to said shaft, spring operated clutch pins for securing said clutches to said power wheels and levers adapted to operate said pins, bolts on said levers and bolts for nominally holding said posts down and locking said levers into engagement with said pins, an armature connected with said bolt, a magnet for attracting said armature and releasing said bolts, a circuit maker for said magnet, means on said scale beams for operating said circuit maker, a trip on said circuit maker, a bell crank mounted on said machine, means connected with said crank for operating a lever, means connected with said levers for simultaneously connecting said bevel gears operating said screw conveyers with said power source, a hook on said bell crank for locking same into an inoperative position, said trip adapted to trip said hook, the shifting of said hook operating means adapted to disconnect said circuit maker and cause said bell crank hook to again lock said bell crank, cams for forcing said spring operating levers into engagement with said pins and disconnecting said pins from said power wheel, means for stopping the rotation of said clutches, a main power shaft from which said first shaft is driven, a bevel gear on one end of said power shaft, a main operating shaft, a loose collar on one end thereof, a bevel gear on one end of said collar, said gear nesting with said gear on said power shaft and revolving continuously, a driving wheel fixed to said collar, a clutch on said main operating shaft, a pin adapted to connect said clutch to said driving wheel on said collar, a lever for operating said pin, a spring for holding said lever nominally engaging said pin, cams on said primary clutch, a pair of rods adapted to be operated by said cams, cross arm connected to said rods, a lever operated rod pivoted to said cross arm, a lever connected therewith and adapted to throw said spring controlled pin operated lever, a hook on each side of said rods for holding them in a lowered position, said lever operated rods being operable only when both of said pair of rods have been lowered and means for simultaneously releasing said pair of rods, a mutilated gear on said main operating shaft, said main operating shaft adapted to make one third revolution intermittently, a gear on said main operating shaft adapted to mesh with a gear on said endless belt conveyer sprocket wheel, a vertical transmitting shaft having a bevel gear on its lower end meshing with said mutilated gear and a gear on its upper end meshing with said transmitting gear.

72. In a weighing and filling machine, an endless conveyer chain belt for conveying cans, means on said conveyer for sealing the mouths of said cans to said conveyer, said sealing means consisting of gaskets on said belt, means for pressing the mouths of said cans against said gaskets, said means consisting of a wheel adapted to bind said cans against said belt, means for holding said cans on said belt, means for holding said cans in an inverted vertical position, means for loading two of said cans at the same time, a rotary delivery disk and means for delivering said cans to said delivery disk.

73. In a weighing and filling machine, an endless conveyer belt for conveying cans, means on said conveyer for sealing the mouths of said cans to said conveyer, said sealing means consisting of gaskets on said belt, a wheel adapted to bind said cans against said belt, means for holding said cans on said belt, means for holding said cans in an inverted vertical position, means for loading two of the cans at the same time, a rotary delivery disk means for delivering said cans to said rotary delivery disk, and means for operating said disk.

74. In a weighing and filling machine, an endless conveyer belt for conveying cans, means on said conveyer for sealing the mouths of said cans to said conveyer, said sealing means consisting of gaskets on said belt, a wheel adapted to bind said cans against said belt, means for holding said cans on said belt, means for holding said cans in an inverted position, means for loading two of the cans at the same time, a rotary delivery disk means for delivering said cans to said rotary delivery disk, means for operating said disk, and means for weighing said loads for said cans.

75. In a weighing and filling machine, an endless conveyer belt for conveying cans, means on said conveyer for sealing the mouths of said cans to said conveyer, said sealing means consisting of gaskets on said belt, a wheel adapted to bind said cans against said belt, means for holding said cans on said belt, means for holding said cans in an inverted vertical position, means for loading two of said cans at the same time, a rotary delivery disk means for delivering said cans to said rotary delivery disk, means for operating said disk, means for weighing said loads for said cans, and means for measuring a part of said loads before weighing, means for augmenting said loads after weighing same.

76. In a weighing and filling machine, an endless conveyer belt for conveying cans, means on said conveyer for sealing the mouths of said cans, said sealing means consisting of gaskets on said belt, a wheel adapted to bind said cans against said belt, means for holding said cans on said belt, means for holding said cans in an inverted vertical position, means for loading two of said cans at the same time, a rotary delivery disk means for delivering said cans to said rotary delivery disk, means for operating said disk, means for weighing said loads for said cans, means for measuring a part of said loads before weighing same, means for augmenting said load after weighing same, and means for loading said weighing means simultaneously, means for dumping said weighing means independently.

77. The combination with a weighing mechanism of a conveyer for cans consisting of perforated plate links adapted to deliver cans to said mechanism, a funnel passing through the perforation of each link, a rigid member for holding cans on said funnels, a resilient slide for said cans, means for agitating said slide.

78. The combination with a weighing mechanism of a conveyer for cans consisting of perforated plate links adapted to deliver cans to said mechanism, a funnel passing through the perforation of each link, a rigid member for holding cans on said funnels, a resilient slide for said cans, means for agitating said slide, means whereby said cans may be caused to disconnect from said funnels.

79. The combination with a weighing mechanism of a conveyer for cans consisting of perforated plate links adapted to deliver cans to said mechanism, a funnel passing through the perforation of each link, a rigid member for holding cans on said funnel, a resilient slide for said cans, means for agitating said slide, means whereby said cans may be caused to disconnect from said funnels, said means consisting of an inclined slide.

80. The combination with a weighing mechanism of a conveyer for cans consisting of perforated plate links adapted to deliver cans to said mechanism, a funnel passing through the perforation of each link, a rigid member for holding cans on said funnel, a resilient slide for said cans, means for agitating said slide, means whereby said cans may be caused to disconnect from said funnels, said means consisting of an inclined slide, a rotatable conveyer for conveying cans from said inclined slide.

81. The combination with a weighing mechanism of a conveyer for cans consisting of perforated plate links, a funnel passing through the perforation of each link, a rigid member for holding cans on said funnel, a resilient slide for said cans, means for agitating said slide, means whereby said cans may be caused to disconnect from said funnels, said means consisting of an inclined slide, a rotatable conveyer for conveying cans from said inclined slide, a scale hopper whereby loads are delivered into said funnels.

82. The combination with a weighing mechanism of a conveyer for cans consisting of perforated plate links, a funnel passing through the perforation of each link, a rigid member for holding cans on said funnel, a resilient slide for said cans, means for agitating said slide, means whereby said cans may be caused to disconnect from said funnels, said means consisting of an inclined slide, a rotatable conveyer for conveying cans from said inclined slide, a scale hopper whereby loads are delivered into said funnels, means for rigidly holding said hopper connected to said funnels.

83. The combination with a weighing mechanism of a conveyer for cans consisting of perforated plate links, a funnel passing through the perforation of each link, a rigid member for holding cans on said funnel, a resilient slide for said cans, means for agitating said slide, means whereby said cans may be caused to disconnect from said funnels, said means consisting of an inclined slide, a rotatable conveyer for conveying cans from said inclined slide, a scale hopper whereby loads are delivered into said funnels, means for rigidly holding said hopper connected to said funnels, said means consisting of a vertically movable member.

84. In combination with a machine having weighing hoppers, a conveyer for cans consisting of perforated plate links, a funnel passing through the perforation of each link, a rigid member for holding cans on said funnel, a resilient slide for said cans, means for agitating said slide, means whereby said cans may be caused to disconnect from said funnels, said means consisting of an inclined slide, a rotatable conveyer for conveying cans from said inclined slide, a scale hopper whereby loads are delivered into said funnels, means for rigidly holding said hopper connected to said funnels, said means consisting of a vertically movable member, a cam for forcing said member down.

85. In combination with a machine having weighing hoppers, a conveyer for cans consisting of perforated plate links, a funnel passing through the perforation of each link, a rigid member for holding cans on said funnel, a resilient slide for said cans, means for agitating said slide, means whereby said cans may be caused to disconnect from said funnels, said means consisting of an inclined slide, a rotatable conveyer for conveying cans from said inclined slide, a scale hopper whereby loads are delivered into said funnels, means for rigidly holding said hopper connected to said funnels, said means consisting of a vertically movable member, a cam for forcing said member down, and said member being pivotally operated.

86. In combination with a machine having weighing hoppers, means for conveying cans to said hoppers, funnels connecting said cans and hoppers, means for sealing the connection between said funnels and hoppers, said means consisting of a movable member between said hoppers and funnels, said member being normally suspended between said hoppers and funnels.

87. In a weighing and filling machine hoppers, means for conveying cans to said hoppers, funnels connecting said cans and hoppers, means for sealing the connection between said funnels and hoppers, said means consisting of a movable member between said hoppers and funnels, said member being normally suspended between said hoppers and funnels and independent thereof.

88. In a weighing and filling machine hoppers, means for conveying cans to said hoppers, funnels connecting said cans and hoppers, means for sealing the connection between said funnels and hoppers, said means consisting of a movable member between said hoppers and funnels, said member being normally suspended between said hoppers and funnels and independent thereof, and a spring whereby said member is held suspended.

89. In a device as described a weighing mechanism, a conveyer, means for sealing cans to said conveyer, means for holding cans on said conveyer, and means whereby said cans may be agitated.

90. In a device as described a weighing mechanism, a conveyer, means for sealing cans to said conveyer, means for holding cans on said conveyer, means whereby said cans may be agitated, means whereby said cans may gradually slip from said holding means.

91. In a device as described a weighing mechanism, a can conveyer, means for sealing cans to said conveyer, means for holding cans on said conveyer, means whereby said cans may be agitated, means whereby said cans may gradually slip from said holding means, an additional conveyer to receive said cans, said additional conveyer being pivotal.

92. In a device as described a weighing mechanism, a can conveyer, means for sealing cans to said conveyer, means for holding cans on said conveyer, means whereby said cans may be agitated, means whereby said cans may gradually slip from said holding means, an additional conveyer to receive said cans, said additional conveyer being pivotal, said pivotal conveyer adapted to be rotated by said first-named conveyer.

93. In a machine as described an endless can conveyer, means on said conveyer adapted to support cans thereon, means whereby cans may release themselves after being filled from said conveyer and an intermittently operated conveyer to receive said filled cans.

94. In a machine as described an endless can conveyer, means on said conveyer adapted to support cans thereon, means whereby cans may release themselves after being filled from said conveyer, an intermittently operated conveyer to receive said filled cans, said intermittent conveyer adapted to be operated by said first-named means.

95. In a machine as described an endless can conveyer, means on said conveyer adapted to support cans thereon, means whereby cans may release themselves after being filled from said conveyer and an intermittently operated conveyer to receive said filled cans, said intermittent conveyer being rotatable.

96. In a machine as described and endless can conveyer, means on said conveyer adapted to support cans thereon, means whereby cans may release themselves after being filled from said conveyer, an intermittently operated conveyer to receive said filled cans, said intermittent conveyer being rotatable, said first-named means being funnels whereby said cans are filled.

97. The described device comprising a weighing mechanism, a belt for conveying cans thereto, a conveyer for conveying cans from said belt, said mechanism adapted to start the operation of said belt, said belt adapted to cause the operation of said conveyer.

98. The described device comprising a weighing mechanism, a belt for conveying cans thereto, a conveyer for conveying cans from said belt, said mechanism adapted to start the operation of said belt, said belt adapted to cause the operation of said conveyer, said conveyer being rotatable.

99. The described device comprising a weighing mechanism, a belt for conveying cans thereto, a conveyer for conveying cans from said belt, said mechanism adapted to start the operation of said belt, said belt adapted to cause the operation of said conveyer, said conveyer being rotatable, funnels on said belt, said funnels adapted to rotate said conveyer.

100. The described device comprising a weighing mechanism, a belt for conveying cans thereto, a conveyer for conveying cans from said belt, and means for causing a retrograde movement of said belt.

101. In a weighing and filling machine a weighing mechanism, a belt for conveying cans thereto, said mechanism adapted to cause the operation of said belt and means for causing a retrograde movement of said belt.

102. In a weighing and filling machine a weighing mechanism, a belt for conveying cans thereto, said mechanism adapted to cause the operation of said belt and means for causing a retrograde movement of said belt, a plurality of weighing hoppers on said mechanism.

103. In a weighing and filling machine a weighing mechanism, a belt for conveying cans thereto, said mechanism adapted to cause the operation of said belt, means for causing a retrograde movement of said belt, a plurality of weighing hoppers on said mechanism, and means for causing said belt to move a sufficient distance to bring a new supply of cans to each of said hoppers.

In testimony whereof I affix my signature, in presence of two witnesses.

DENIS ALBERT FLAVELL.

Witnesses:
 FREDRICH HÜLESCHMANN,
 PHILIP MCKEAN.